(12) United States Patent
Tsuji

(10) Patent No.: US 6,678,629 B2
(45) Date of Patent: Jan. 13, 2004

(54) PORTABLE ALTIMETER AND ALTITUDE COMPUTING METHOD

(75) Inventor: Tomoharu Tsuji, Chiba (JP)

(73) Assignee: Seiko Instruments Inc., Chiba (JP)

( * ) Notice: Subject to any disclaimer, the term of this patent is extended or adjusted under 35 U.S.C. 154(b) by 383 days.

(21) Appl. No.: 09/765,552

(22) Filed: Jan. 19, 2001

(65) Prior Publication Data

US 2002/0032539 A1 Mar. 14, 2002

(30) Foreign Application Priority Data

Jan. 31, 2000 (JP) ........................................ 2000-022872
Aug. 9, 2000 (JP) ........................................ 2000-241336

(51) Int. Cl.$^7$ ................................................ G01L 9/00
(52) U.S. Cl. ........................ 702/139; 702/98; 702/150; 702/138; 73/384
(58) Field of Search ........................ 702/139, 98, 104, 702/138, 150, 177; 701/4, 123, 214; 73/718 R, 723, 384, 861

(56) References Cited

U.S. PATENT DOCUMENTS

| | | | |
|---|---|---|---|
| 4,969,358 A | * 11/1990 | Peet, II | ........................ 73/384 |
| 5,058,427 A | 10/1991 | Brandt | ........................ 73/384 |
| 6,449,573 B1 | * 9/2002 | Amos | ........................ 702/98 |
| 6,529,827 B1 | * 3/2003 | Beason et al. | ........................ 701/213 |

OTHER PUBLICATIONS

Patent Abstracts of Japan, vol. 018, No. 436(P–1786), Aug. 15, 1994.

* cited by examiner

*Primary Examiner*—John Barlow
*Assistant Examiner*—Hien Vo
(74) *Attorney, Agent, or Firm*—Adams & Wilks

(57) ABSTRACT

A portable altimeter of the present invention is provided with a movement determining unit for determining whether or not the altimeter is at a standstill or moving by comparing an amount of change in altitude with a prescribed standstill threshold value and movement threshold value. When the standstill mode is set, the moving mode is then set only when the amount of change equals or exceeds the movement threshold value, and when the moving mode is set, the standstill mode is then set only when the amount of change falls below the standstill threshold value.

38 Claims, 28 Drawing Sheets

FIG.22A

| LABEL DATA | DATE DATA | TIME DATA | ALTITUDE DATA | DISPLAY LENGTH DATA | TIME DATA | ALTITUDE DATA | DISPLAY LENGTH DATA | ..... |
|---|---|---|---|---|---|---|---|---|

FIG.22B

| LABEL DATA | DATE DATA | TIME DATA | ESTIMATED ALTITUDE DATA | DISPLAY LENGTH DATA | TIME DATA | ESTIMATED ALTITUDE DATA | DISPLAY LENGTH DATA | ..... |
|---|---|---|---|---|---|---|---|---|

FIG.22C

| LABEL DATA | DATE DATA | TIME DATA | ASCENT/DESCENT RATE DATA | DISPLAY LENGTH DATA | TIME DATA | ASCENT/DESCENT RATE DATA | DISPLAY LENGTH DATA | ..... |
|---|---|---|---|---|---|---|---|---|

TIME DISPLAY MODE

MOVEMENT DETECTION →

← STANDSTILL DETECTION

ALTITUDE DISPLAY MODE

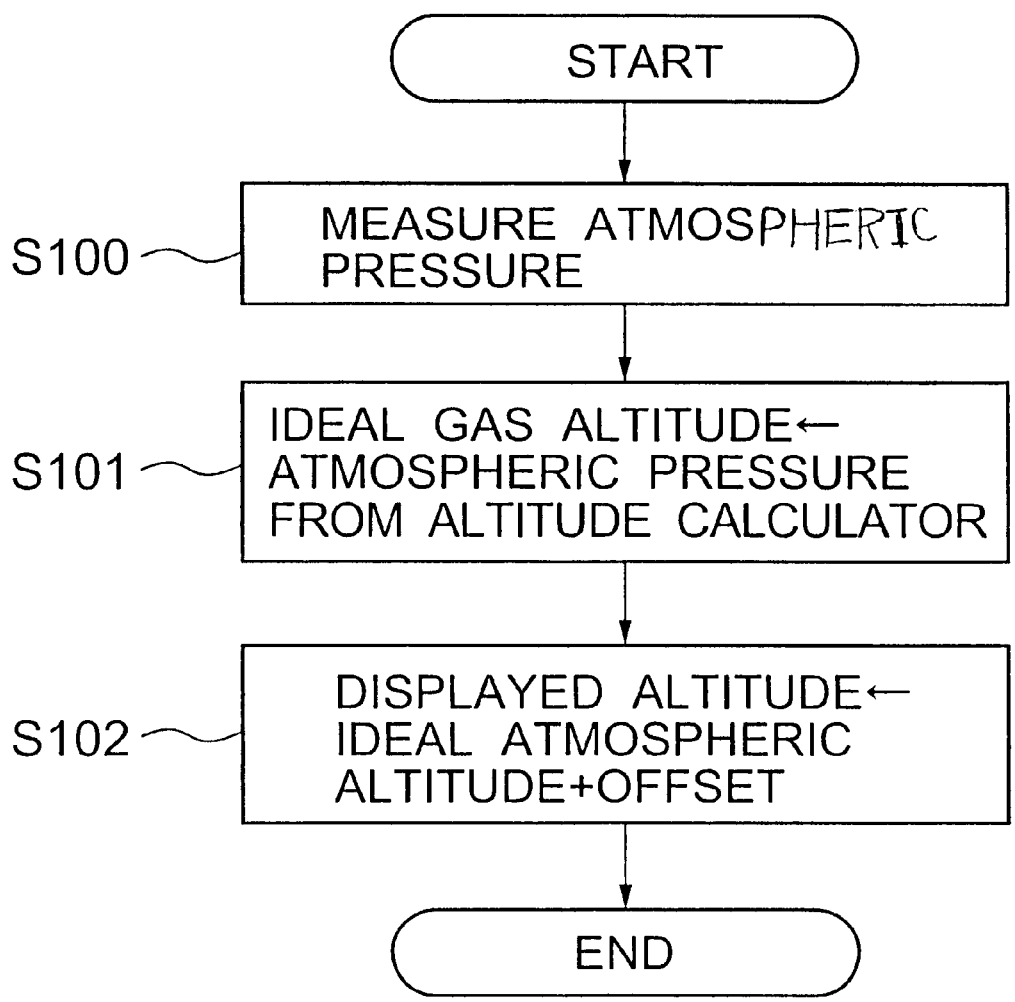

US 6,678,629 B2

PORTABLE ALTIMETER AND ALTITUDE COMPUTING METHOD

BACKGROUND OF THE INVENTION

1. Field of the Invention

The present invention relates to an altimeter for measuring altitude based on pressure sampled at prescribed intervals and particularly to a highly portable altimeter.

2. Description of the Prior Art

This kind of portable altimeter is, for example, incorporated into the body of a wristwatch and has become widely publicized together with the recent increase in participation in outdoor activities. A block view of the essential parts of the configuration of this kind of related portable altimeter is shown in FIG. 27. The related portable altimeter shown in FIG. 27 is provided with a pressure sensor 100 for measuring pressure, an A/D converter 101 for converting an analog output for pressure from the pressure sensor 100 into a digital signal, a measurement controller 102 for controlling the pressure sensor 100 and the A/D converter 101, a pressure/altitude calculator 103 for calculating altitude based on pressure converted at the AID converter 101, a display altitude calculator 104 for subjecting the altitude calculated by the pressure/altitude calculator 103 to offset compensation, a switch 105 for carrying out an arbitrary instruction, a display panel 106 for displaying altitude, etc., a ROM 107 for storing programs for processing altitude measurements, a RAM 108 for temporarily storing measured values, etc., and a controller 109 for controlling each part.

A flowchart of an altitude measuring process for a related portable altimeter of this kind of configuration is shown in FIG. 28. As shown in FIG. 28, in this altitude measuring process, first, pressure is measured by the pressure sensor 100 (step S100) and altitude is calculated based on this pressure (step S101). This altitude calculation is carried out using equation (1) in the following so as to conform to the International Standard Atmosphere as specified by the International Civil Aviation Organization (ICAO).

$$\text{Altitude in an ideal gas (m)} = \qquad \text{(Equation 1)}$$
$$44332 \times \{1 - (\text{pressure (hPA)}/1013.25)^{0.1903}\}$$

However, equation (1) is fulfilled for conditions where (a) an equation of state is fulfilled for an ideal gas, (b) where the pressure is 1013.25 hPa and the temperature is 15 degrees at a location 0 m above sea level, and (c) where temperature falls by 6.5 degrees for a rise of 1000 m. However, in reality, errors occur due to reasons such as, (d) the Earth's atmosphere is not an ideal gas, (e) atmospheric pressure usually fluctuates and is therefore not fixed at 1013.25 hPa at 0 m above sea level, and (f) measuring errors occur within the pressure measuring system itself.

In order to resolve this error, an operation assigning an offset value to the altitude (hereinafter referred to as the "ideal gas altitude") calculated in accordance with the above equation is carried out at the display altitude calculator 104, a final displayed altitude (hereinafter referred to as "displayed altitude") is decided upon (step S102), and this process ends (step 103). The decided displayed altitude is then displayed at the display panel 106. This offset value is a sum of the aforementioned errors, and is a correction value obtained by the user inputting the current altitude. This relationship is shown in the following equation (2).

displayed altitude (m)=offset value (m)+ideal gas altitude (m)   (2)

However, it is of course preferable to provide an accurate way of measuring altitude without the user having to input current altitudes one by one to carry out offsetting. Altimeters have therefore also been proposed in the related art to resolve this kind of problem by identifying the presence or absence of actual changes in altitude.

In, for example, Japanese Patent Laid-open Publication No. Hei. 8-285582 and Japanese Patent Laid-open Publication No. Hei. 8-261755, it is proposed to provide, for example, a vibration sensor or a position sensor for detecting the presence or absence of movement of the altimeter and then maintain a fixed displayed altitude while ignoring changes in pressure when no movement of the altimeter is detected by these sensors (when the altimeter is not moving). Alternatively, it has also been proposed to obtain a change in altitude per unit of time, compare this altitude change with a prescribed reference change, and then determine that there has been a change in altitude only when this change in altitude exceeds a reference change in altitude (Please refer to Japanese Patent Laid-open No. 6-137976 and Japanese Patent Laid-open No. 6-501553, although the object of these reference examples differs from that of this application).

However, when movement detection is carried out as described in the former case, it is necessary to provide new sensors, etc., the cost of manufacturing the altimeter increases accordingly, and the device itself also becomes large. This is a major problem, particularly for portable altimeters where device miniaturization is sought.

Further, in the latter case where the altitude change is compared with a reference change, just one reference change can be set and there are therefore cases where there is no correspondence with actual changes in altitude. In other words, with this method, when the reference change is exceeded, it is determined immediately that there has been an actual change in altitude, and when the reference change is fallen below, it is immediately determined that there has actually been no change in altitude. However, in reality, there are also intermediate situations where there is actually no change in altitude when the reference change is exceeded, and also, on the contrary, cases where there has actually been a change in altitude when the reference change has been fallen below. If this kind of situation cannot be reliably determined, then measurement errors cannot be resolved.

SUMMARY OF THE INVENTION

In order to resolve the aforementioned problems, it is the object of the present invention to provide a portable altimeter capable of maintaining device portability, and precisely determine the presence or absence of actual changes in altitude to give highly accurate altitude measurements.

FIG. 1 is a block view of essential parts of a configuration for a portable altimeter of a first embodiment of the present invention. In FIG. 1, in addition to substantially the same basic structure as the related art, this portable altimeter is provided with a movement determining unit 12 for determining whether or not the altimeter is at a standstill or is moving by comparing an amount of change in altitude with a prescribed standstill threshold value 20 and a movement threshold value 30.

A portable altimeter of the present invention therefore comprises a pressure sensor for measuring pressure,
 a pressure/altitude calculating unit for calculating altitude from pressure measured by the pressure sensor,
 an altitude variation calculating unit for calculating a difference in altitude between the altitude calculated by the pressure/altitude calculating unit and another altitude for prior to calculation of the altitude, and a movement determining unit constituted by a first determining unit for determining whether or not the altitude difference calculated by the altitude variation calculating unit is at a standstill, and a second determining unit for determining whether or not there is movement from the altitude difference calculated by the altitude variation calculating unit.

Determinations can therefore be made without using newly provided sensors etc. to determine whether the altimeter is moving or at a standstill, and measurement precision is improved.

In the present invention, the portable altimeter also has a movement duration timer for measuring a duration or number of durations occurring in a moving mode.

Moving states can therefore be measured, moving states can be more accurately determined, and measurement precision is improved.

The portable altimeter of the present invention also has a pressure gradient calculator for calculating changes in pressure occurring in standstill mode.

As a result, by being aware of changes in pressure occurring in standstill mode, it can be reliably determined whether changes in altitude are changes due to fluctuations in air pressure or changes due to movement, and measurement precision can therefore be improved.

A portable altimeter of the present invention also comprises a pressure sensor for measuring pressure, a pressure/altitude calculating unit for calculating altitude from pressure measured by the pressure sensor, an altitude variation calculating unit for calculating a difference in altitude between the altitude calculated by the pressure/altitude calculating unit and another altitude for prior to calculation of the altitude, and a movement determining unit constituted by a determining unit for determining whether or not a transition is made from the altitude difference calculated by the altitude variation calculating unit and a movement duration timer for measuring a duration or number of durations occurring in a moving mode.

Moving states can therefore be measured, moving states can be more accurately determined, and measurement precision is improved.

A portable altimeter of the present invention also comprises a pressure sensor for measuring pressure, a pressure/altitude calculating unit for calculating altitude from pressure measured by the pressure sensor, an altitude variation calculating unit for calculating a difference in altitude between the altitude calculated by the pressure/altitude calculating unit and another altitude for prior to calculation of the altitude, and a movement determining unit constituted by a determining unit for determining whether or not a transition is made from the altitude difference calculated by the altitude variation calculating unit, a movement duration timer for measuring a duration or number of durations occurring in a moving mode, and an atmospheric pressure tendency calculator for calculating changes in atmospheric pressure occurring in standstill mode.

As a result, precise measurements can be made without providing a standstill threshold value by combining changes in atmospheric pressure in standstill mode and changes in altitude.

The portable altimeter of the present invention can also be provided with a controller for calculating altitude based on pressure changing in accompaniment with actual changes in altitude to the exclusion of changes in pressure accompanying fluctuations in atmospheric pressure and making and displaying a time-altitude graph based on a relationship of the calculated altitude and time. The portable altimeter of the present invention can further be provided with a controller for calculating altitude based on pressure changing in accompaniment with actual changes in altitude to the exclusion of changes in pressure accompanying fluctuations in atmospheric pressure and making and displaying a time/estimated-altitude graph based on a relationship of the calculated altitude, and time. The portable altimeter of the present invention can also be provided with a controller for calculating altitude based on pressure changing in accompaniment with actual changes in altitude to the exclusion of changes in pressure accompanying fluctuations in atmospheric pressure, and making and displaying a rate of ascent/descent graph based on a relationship of a value for the obtained values by calculating a rate of ascent/descent from the calculated altitude, and time.

The present invention also provides an altitude measuring method for deciding a current altitude based on determination results of a movement determination step. Here, with a portable altimeter for measuring altitude based on pressure sampled in prescribed intervals, standstill threshold values and movement threshold values are preset at reciprocal intervals as threshold values for an amount of change in pressure or altitude per prescribed period of time.

Then, the movement determination step, when it is determined from a past measurement that the altimeter is at a standstill, determines that the altitude remains at a standstill when an absolute value for a newly-obtained amount of change corresponds to an intermediate range between the standstill threshold value and the movement threshold value or falls below the standstill threshold value, determines that the altimeter has moved to a moving state when the absolute value for the amount of change exceeds the movement threshold value, and when it is determined from a past measurement that the altimeter is in a moving state, determines that the altimeter remains in a moving state when the newly obtained amount of change corresponds to the intermediate range or when the newly obtained amount of change exceeds the movement threshold value, and determines that the altimeter has moved to a standstill when the absolute value for the amount of change falls below the standstill threshold value.

At a movement determining unit 12, when the altimeter is in standstill mode, it is determined that the altimeter is maintaining a standstill mode when a new amount of change corresponds to an intermediate range between a standstill threshold value 20 and a movement threshold value 30, and it is determined that the altimeter has made a transition to a moving state when the amount of change rises above the movement threshold value 30. Further, when the altimeter is in moving mode, the altimeter is determined to still be moving when the new amount of change corresponds to the intermediate range or exceeds the movement threshold value 30, and the altimeter is determined to have made a transition to a standstill when the amount of change falls below the standstill threshold value 20. The current altitude is then decided based on the results of these determinations. In other words, no change is made to the current altitude when it is determined that the altimeter is at a standstill, but the current altitude is updated to a new altitude by a display altitude calculator 5 when it is determined that the altimeter is moving.

According to this process, determinations are made taking into consideration the situation up until that point in indeterminate cases where it is not clear whether the altimeter is at a standstill or moving and a much more accurate determination can therefore be achieved. The presence or absence of an actual change in altitude can therefore be precisely determined and highly accurate altitude measurements can be made. Further, the presence or absence of movement of the altimeter can be determined using this process without it being necessary to provide sensors such as vibration sensors or position sensors. The device is therefore prevented from becoming large and a small altimeter with a configuration suited to portable applications can be provided.

With the altitude measuring method of the present invention, when it is determined from a past measurement that the altimeter is in a moving state, the movement determination step determines that the altimeter has moved to a standstill when the newly obtained amount of change continues to be in excess of a prescribed value so as to correspond to the intermediate range.

The present invention also provides an altitude measuring method for deciding a current altitude based on determination results of a movement determination step. Here, with a portable altimeter for measuring altitude based on pressure sampled in prescribed intervals, a movement threshold value is preset at a threshold value for an amount of change in pressure or altitude per prescribed period of time.

Then, in the movement determination step, when it is determined from a past measurement that the altimeter is at a standstill, it is determined that the altitude remains at a standstill when an absolute value for a newly-obtained amount of change falls below the movement threshold value, determines that the altimeter has moved to a moving state when the amount of change exceeds the movement threshold value, and when it is determined from a past measurement that the altimeter is in a moving state, determines that the altimeter remains in a moving state when the newly obtained amount of change exceeds the movement threshold value, and determines that the altimeter has moved to a standstill when the absolute value for the amount of change falls below the standstill threshold value but continues to be above the prescribed value.

In a further situation for a determination by the movement determining unit 12, just the movement threshold value 30 is set up and determinations can then be made taking into consideration continuous durations of the intermediate range, i.e. during moving mode, it is determined that the altimeter has become stationary when the newly obtained amount of change falls below the movement threshold value 30 and continues to do so for more than a prescribed value.

Precision is therefore improved as a result of this process. In particular, the amount of calculation required is reduced because the standstill threshold value 20 is not set and determination as to the magnitude of the amount of change with respect to the standstill threshold value 20 is not required.

The altitude measuring method of the present invention further comprises a tendency calculating step of obtaining a tendency value indicating a tendency of the amount of change of pressure by subjecting the amount of change in pressure obtained when the altimeter is determined to be at a standstill to prescribed statistical processing, wherein a current altitude is decided based on determination results of the movement determination step and the tendency value obtained in the tendency calculating step.

When moving mode is temporarily set by the above process, and when the amount of change in atmospheric pressure or altitude continues for a long period to be within the intermediate range, the possibility that the altimeter is at a standstill is high. In this case, it can be determined when the amount of change continues to be within the intermediate range for more than a prescribed value that the altimeter has come to a standstill, and the mode can be changed to standstill mode.

According to this process, when moving mode is set, the amount of change continues to be in the intermediate range without reaching as far as the standstill threshold value 20, the altimeter is determined to be at a standstill, and the displayed altitude can be updated. In addition to the basic results stated above, and altitude precision is improved.

In addition to the above process, it is also possible to carry out correction taking into consideration the tendency of changes in atmospheric pressure occurring in standstill mode, i.e. a tendency value indicating the tendency of the amount of change of the atmospheric pressure is obtained based on the amount of change of atmospheric pressure obtained when the altimeter is in standstill mode and a current altitude is decided based on this tendency value.

According to this processing, the tendency of the change in atmospheric pressure in standstill mode is taken into consideration and correction of the displayed altitude is then carried out to give much more precise altitude measurements.

The altitude measuring method of the present invention can also comprise a calculating step for carrying out calculations based on atmospheric pressure changing in accompaniment with actual changes in altitude to the exclusion of the influence of atmospheric fluctuations, an altitude recording step for recording calculated altitudes acquired at prescribed times, and a graph making step for making a time/altitude graph based on a relationship of the recorded altitude, and time. The altitude measuring method of the present invention can also comprise a calculating step for carrying out calculations based on atmospheric pressure changing in accompaniment with actual changes in altitude to the exclusion of the influence of atmospheric fluctuations, an altitude recording step for recording calculated altitudes acquired at prescribed times, an estimation step for estimating and recording the recorded altitude, and a graph making step for making a time/estimated value graph based on a relationship of the estimated values, and time. The altitude measuring method of the present invention can also comprise a calculating step for carrying out calculations based on atmospheric pressure changing in accompaniment with actual changes in altitude to the exclusion of the influence of atmospheric fluctuations, an altitude recording step for recording calculated altitudes acquired at prescribed times, an ascent/descent rate calculating step for calculating and recording the ascent/descent rate from the recorded altitude, and a graph making step for making an ascent/descent rate graph based on a relationship of a value for the ascent/descent rate obtained through calculation, and time.

BRIEF DESICRIPTION OF THE DRAWINGS

A preferred form of the present invention is illustrated in the accompanying drawings in which:

FIG. 22 are views showing an example of a concept for a data structure for bar graph display data;

FIG. 28 is a flowchart for an altitude measuring process for the related portable altimeter.

DETAILED DESCRIPTION OF THE PREFERRED EMBODIMENTS

The following is a detailed description based on the drawings of a portable altimeter of the present invention. The present invention is, however, by no means limited by the following embodiments.

First Embodiment

Figure 1:
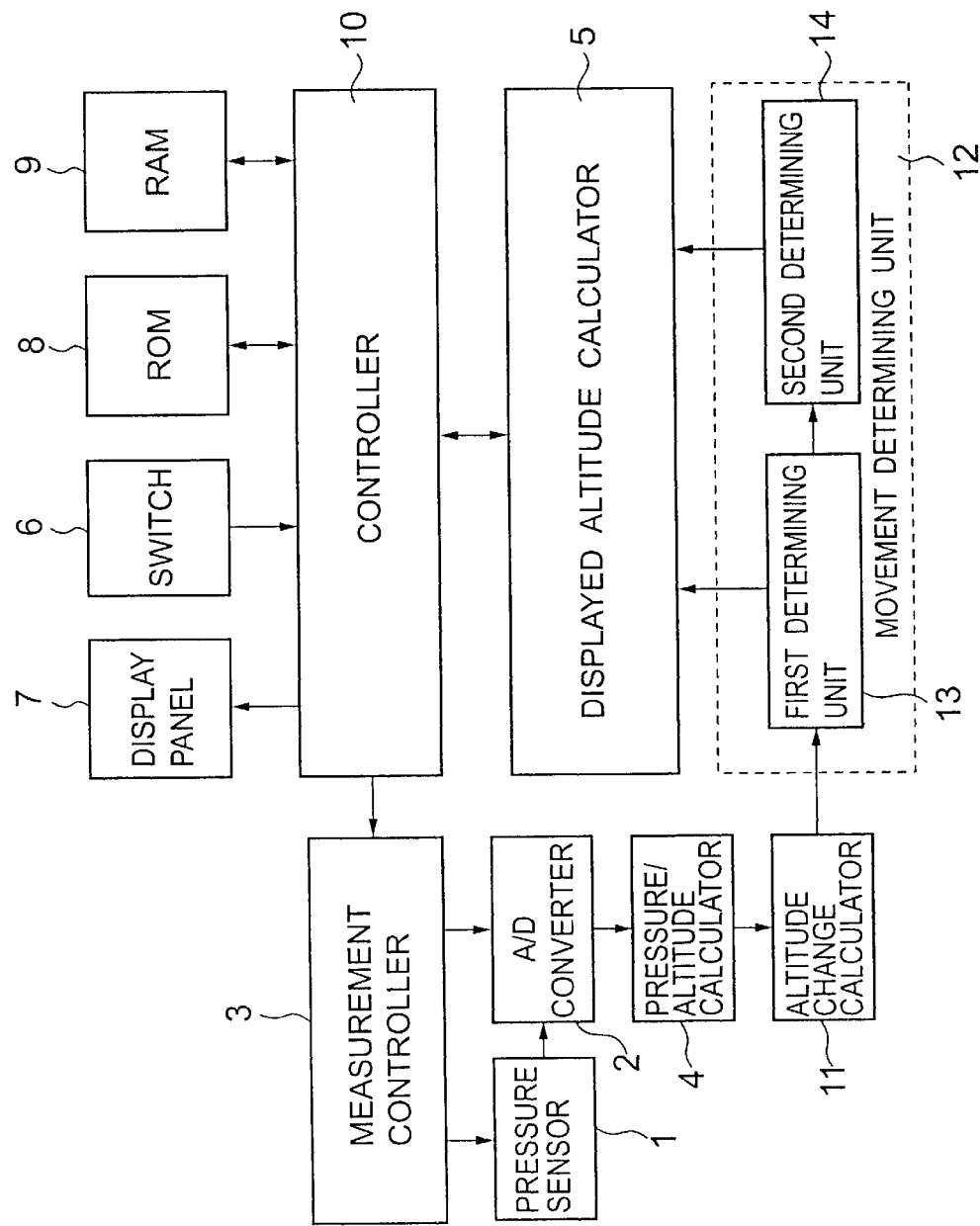
FIG. 1 is a block view of the configuration of essential parts of a portable altimeter of a first embodiment of the present invention.

FIG. 1 is a block view of essential parts of the configuration of a portable altimeter of a first embodiment. In this embodiment, a portable altimeter sets two threshold values of a standstill threshold value 20 and a movement threshold value 30 as threshold values for change in altitude and then calculates altitude. The portable altimeter also has other arbitrary configuration elements such as timers for determining when a time function is reached and wristbands for increasing portability but FIG. 1 mainly only shows elements of the configuration relating to measuring altitude.

Figure 27:
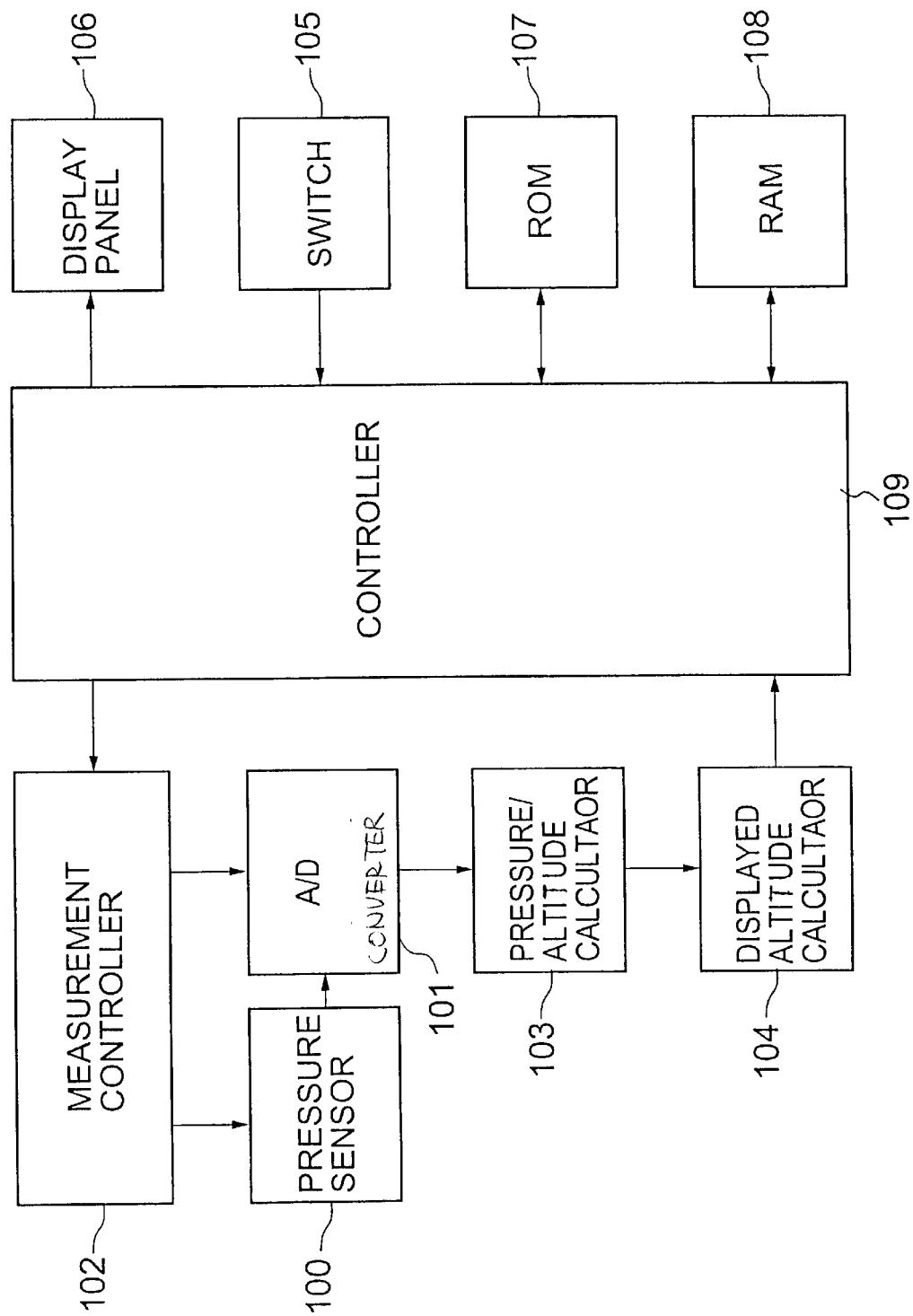
FIG. 27 is a block view of the essential parts of a configuration of a related portable altimeter.

In FIG. 1, a portable altimeter (hereinafter referred to as "altimeter") of this embodiment is provided with a pressure sensor 1, A/D converter 2, measurement controller 3, pressure/altitude calculator 4, displayed altitude calculator 5, switch 6, display panel 7, ROM 8, RAM 9 and controller 10. Each of these elements of the configuration have the same functions as each of the elements of the configuration of the related art shown in FIG. 27, with the exception of noted special cases, i.e. a pressure measured by the pressure sensor 1 is converted to a digital signal by the A/D converter 2, an altitude is calculated in accordance with equation (1) at the pressure/altitude calculator 4, and this altitude is corrected at the displayed altitude calculator 5. The pressure sensor 1 and the A/D converter 2 are controlled by the measurement controller 3, arbitrary instructions are carried out using the switch 6, and the displayed altitude is displayed at the display panel 7. Programs etc. for processing altitude measurements are stored in the ROM 8 and measured values are temporarily stored in the RAM 9.

The altimeter is provided with an altitude change calculator 11 and a movement determining unit 12, and differs from the related art in that correction of the displayed altitude is carried out by the displayed altitude calculator 5 using the altitude change calculator 11 and the movement determining unit 12.

The altitude change calculator 11 is for obtaining a difference (hereinafter referred to as amount of change in altitude) between an ideal gas altitude and an ideal gas altitude calculated on a previous occasion every time the ideal gas altitude is calculated.

The movement determining unit 12 determines motion by establishing whether or not the altimeter is moving. Determinations at the movement determining unit 12 are carried out by comparing a change in altitude with the standstill threshold value 20 and the movement threshold value 30 (the specific contents of which are described later) rather than using the vibration sensor or position sensor of the related art.

Figure 3:
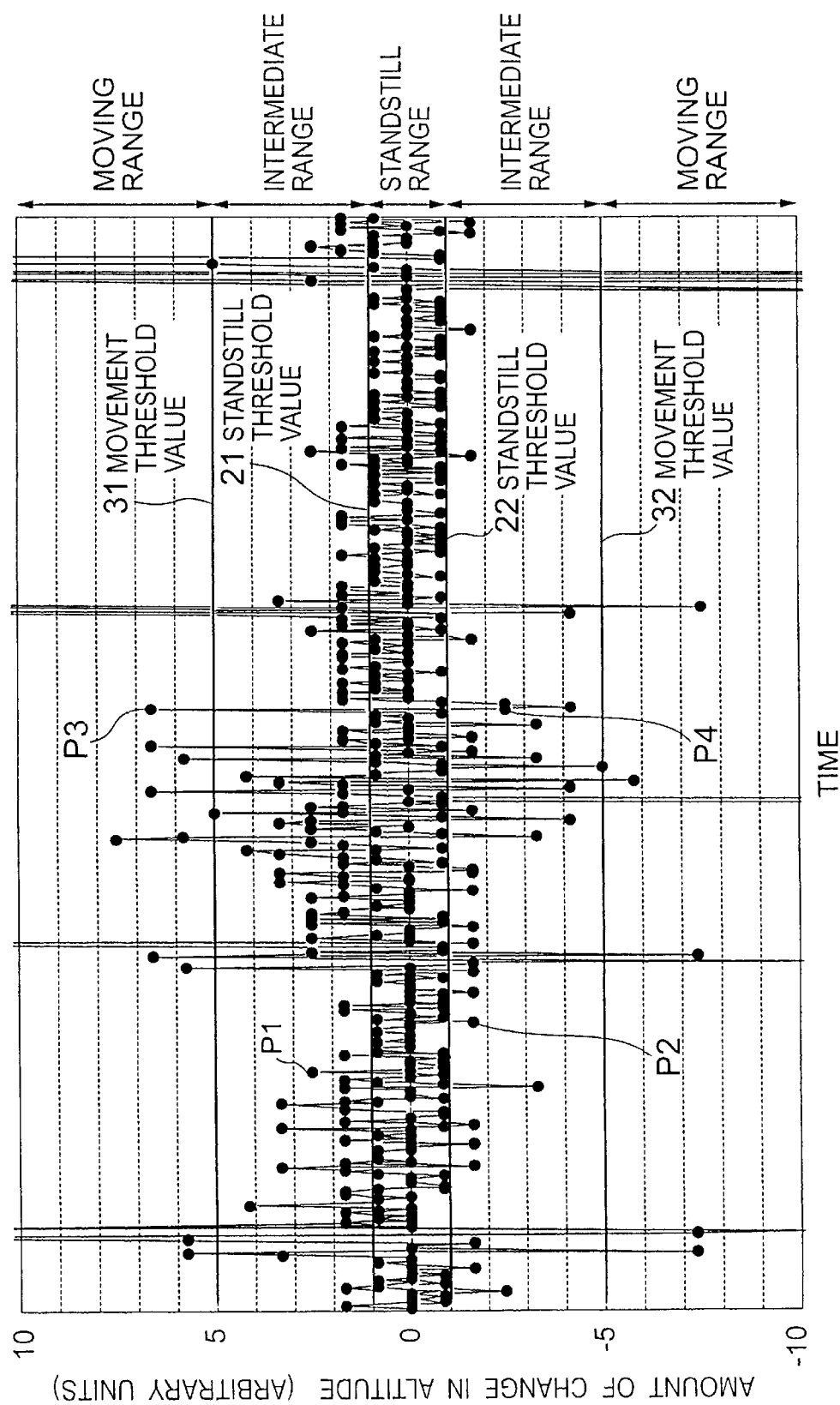
FIG. 3 is a graph showing a relationship between time and amount of change in altitude.

The two threshold values of the standstill threshold value 20 and the movement threshold value 30 are set as these prescribed threshold values. FIG. 3 is a graph showing the relationship between time (horizontal axis) and change in altitude (vertical axis). First, the standstill threshold value 20 is a reference value for defining a range for which the likelihood that the altimeter is positioned at the same altitude (at a standstill) is high. For example, in FIG. 3, the standstill threshold value 20 is set symmetrically to two points of a plus side 21 and a minus side 22 about a center where the change in altitude is zero. Further, the movement threshold value 30 is a reference value for defining a range for which the likelihood that the altimeter is not positioned at the same altitude (is moving) is high and is set to a range of larger absolute values than the standstill threshold value 20. For example, the movement threshold value 30 in FIG. 3 is set to a position of a plus side 31 and a minus side 32, with respect to the standstill threshold value 20.

The movement threshold value 30 is set to be a fixed interval apart from the standstill threshold value 20 and the relative spacing of the standstill threshold value 20 and the movement threshold value 30 is set to be an intermediate range. This intermediate range is a range where it is possible that the altimeter may either be at a standstill or moving, and therefore means that the altimeter is in an indeterminate state. In FIG. 3, the movement threshold values 30 are set to the plus side and the minus side of the standstill threshold values 20, and the plus side and minus side of the standstill threshold values 20 are therefore also set for the intermediate range. The intermediate range can therefore be decided univocally by setting the standstill threshold value 20 and the movement threshold value 30 and therefore does not have to be expressly set.

Specific values for each threshold value can be decided by experimentation, by using logical operations taking into consideration the influence of atmospheric fluctuations on the ideal gas altitude, or by another arbitrary method. Threshold values decided in this manner are stored in advance in the ROM 8 and referred to as necessary.

A first determining unit 13 and a second determining unit 14 are provided at the movement determining unit 12 in order to carry out determinations using the threshold values. The first determining unit 13 compares the relationship of the magnitudes of the amount of change in altitude and the standstill threshold value 20. The second determining unit 14 compares the relationship of the magnitudes of the amount of change in altitude and the movement threshold value 30. The specific contents of the determinations of each determining part is described later.

Of the elements configuring this altimeter, all or arbitrary items of the measurement controller 3, the pressure/altitude calculator 4, the altitude change calculator 11, the movement determining unit 12, the displayed altitude calculator 5 and the controller 10 can be configured from a CPU and a program that can be understood by a CPU or by wired logic. Further, arbitrary non-volatile storage means can be employed in place of the ROM 8 and arbitrary re-writable storage means can be used in place of the RAM 9.

Next, a description is given of an altitude measuring process for the altimeter configured in this manner. This altitude measuring process is a process for maintaining or updating the current displayed altitude and is carried out in prescribed time periods (for example, every five minutes) permitted by timing means (not shown) or is carried out a prescribed number of times (usually once) at arbitrary times when an update instruction is inputted via the switch 6. In this process, either a standstill mode or a moving mode is set in response to whether to take into consideration that the altimeter was at a standstill or was moving. The displayed altitude is then updated only when moving mode is set but the currently displayed altitude is kept as is when standstill mode is set.

Figure 2:
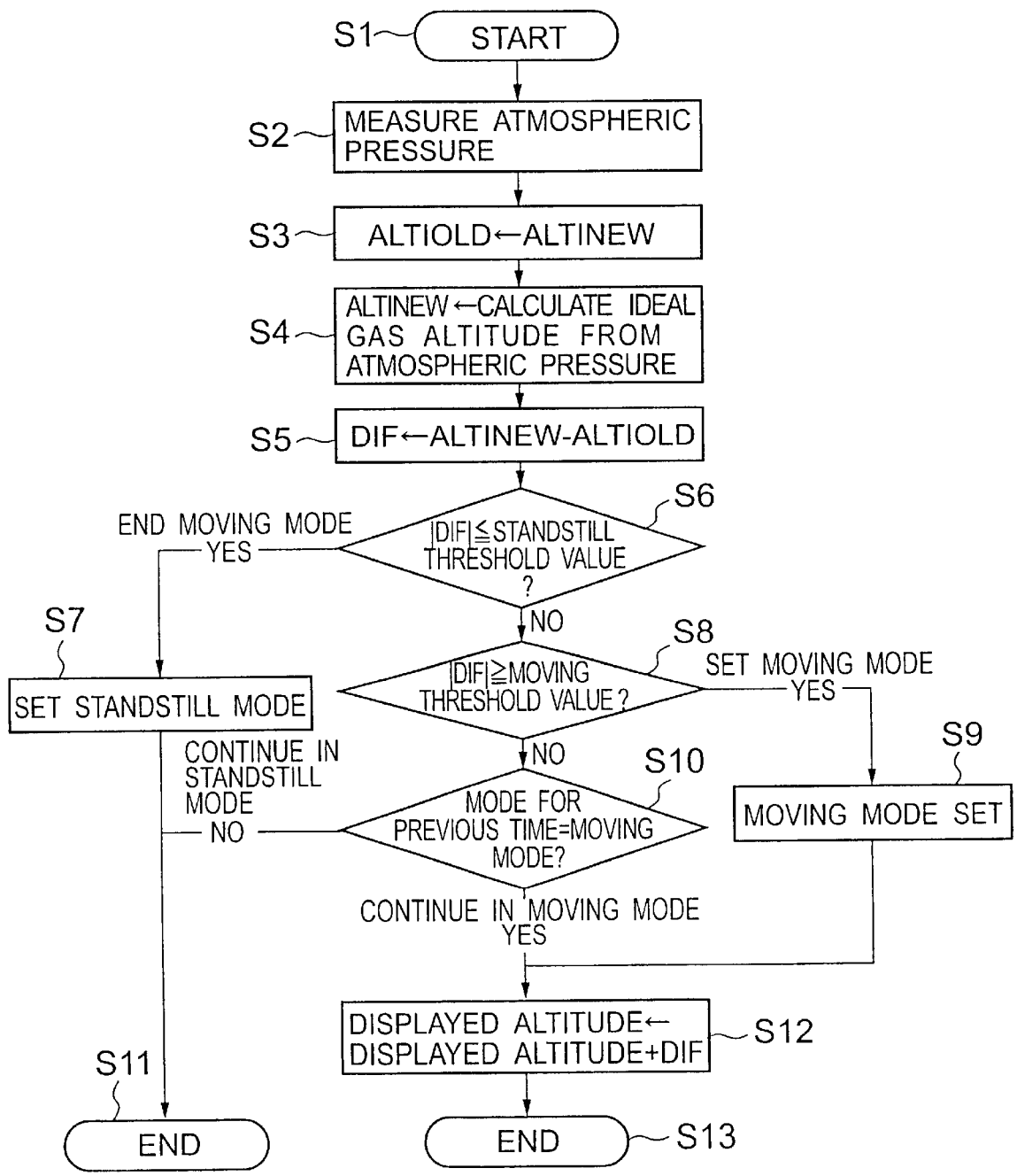
FIG. 2 is a flowchart of an altitude measuring process of the first embodiment.

A detailed description is now given of the contents of this process. FIG. 2 shows a flowchart of this altitude measuring process. In this process, the process commences (step S1), and pressure is measured at the pressure sensor 1 (step S2). The measured pressure is then outputted to the A/D converter 2 as an analog signal and is converted to a digital signal by the A/D converter 2. The pressure is then outputted to the pressure/altitude calculator 4 as this digital signal and ideal atmospheric pressure is calculated based on the aforementioned equation (1) (step S4). The ideal gas pressure obtained in this manner is then assigned to the variable ALTINEW and stored in the RAM 9 (also step S4). Prior to assigning this variable, the value assigned to the variable ALTINEW in the previous altitude calculating process is instead assigned to the variable ALTIOLD and stored in the RAM 9 (step S3).

After step S4, the altitude change calculator 11 calculates the amount of change in altitude by subtracting ALTIOLD from ALTINEW and assigns this amount of change in altitude to a variable DIF for storage in the RAM 9 (step S5). The method of employing each of the variables given here is only an example, and other arbitrary methods, such as obtaining a difference between a newly calculated ideal atmospheric pressure and a previously calculated ideal atmospheric pressure, can also be adopted.

Next, a determination is made by the first determining unit 13. This determination is carried out by determining whether or not an absolute value for the variable DIF is less than or equal to the standstill threshold value 20 (step S6). When the absolute value for the variable DIF is less than or equal to the standstill threshold value 20, the mode is set to standstill mode (step S7) because this altimeter takes into consideration the fact that the altimeter is already at a standstill. This mode setting is implemented by, for example, switching a prescribed flag indicating the mode between 0 or 1. When standstill mode is set in this manner then the fact that there are no actual changes in altitude can be taken into consideration, and the process ends (step S11) without updating the displayed altitude.

On the other hand, when it is determined in step S6 that the absolute value for the variable DIF is not less than the standstill threshold value 20, a determination is made by the second determining unit 14. This determination is carried out by determining whether or not the absolute value for the variable DIF is greater than or equal to the movement threshold value 30 (step S8). When the absolute value for the variable DIF is more than or equal to the movement threshold value 30, the mode is set to moving mode (step S9) because this altimeter takes into consideration the fact that the altimeter is moving. The displayed altitude is then updated (step S12) by adding the value of the variable DIF (the amount of change in altitude) to the currently displayed altitude and the process ends (step S13). The displayed altitude obtained in this manner is then outputted to and displayed at the display panel 7.

When it is determined in step S8 that the amount of change in altitude is not greater than or equal to the movement threshold value 30, i.e. when this change falls within the intermediate range, a determination is made as to whether the mode set in the previous altitude measurement process (the currently set mode) is the standstill mode or the moving mode (step S10) and this mode is continued. Specifically, when the mode for the previous time is not the moving mode (but rather the standstill mode), the standstill mode is continued, and this process ends (step S11). Alternatively, when the mode for the previous time is the moving mode, the moving mode is continued, the display altitude operation is carried out (step S12), this process ends (step S13) and the altitude is displayed.

For example, in FIG. 3, each of the amounts of change in altitude between the points P1 and P2 are positioned so as to be less than or equal to the plus side standstill threshold value 21 and greater than or equal to the minus side standstill threshold value 22, or within the intermediate range and with these amounts the stationary mode continues and the displayed altitude is not updated. On the other hand, at point P3, moving mode is set and when an amount of change immediately thereafter such as with point P4 is positioned within the intermediate range, the moving mode is continued and the displayed altitude is updated.

Figure 4:
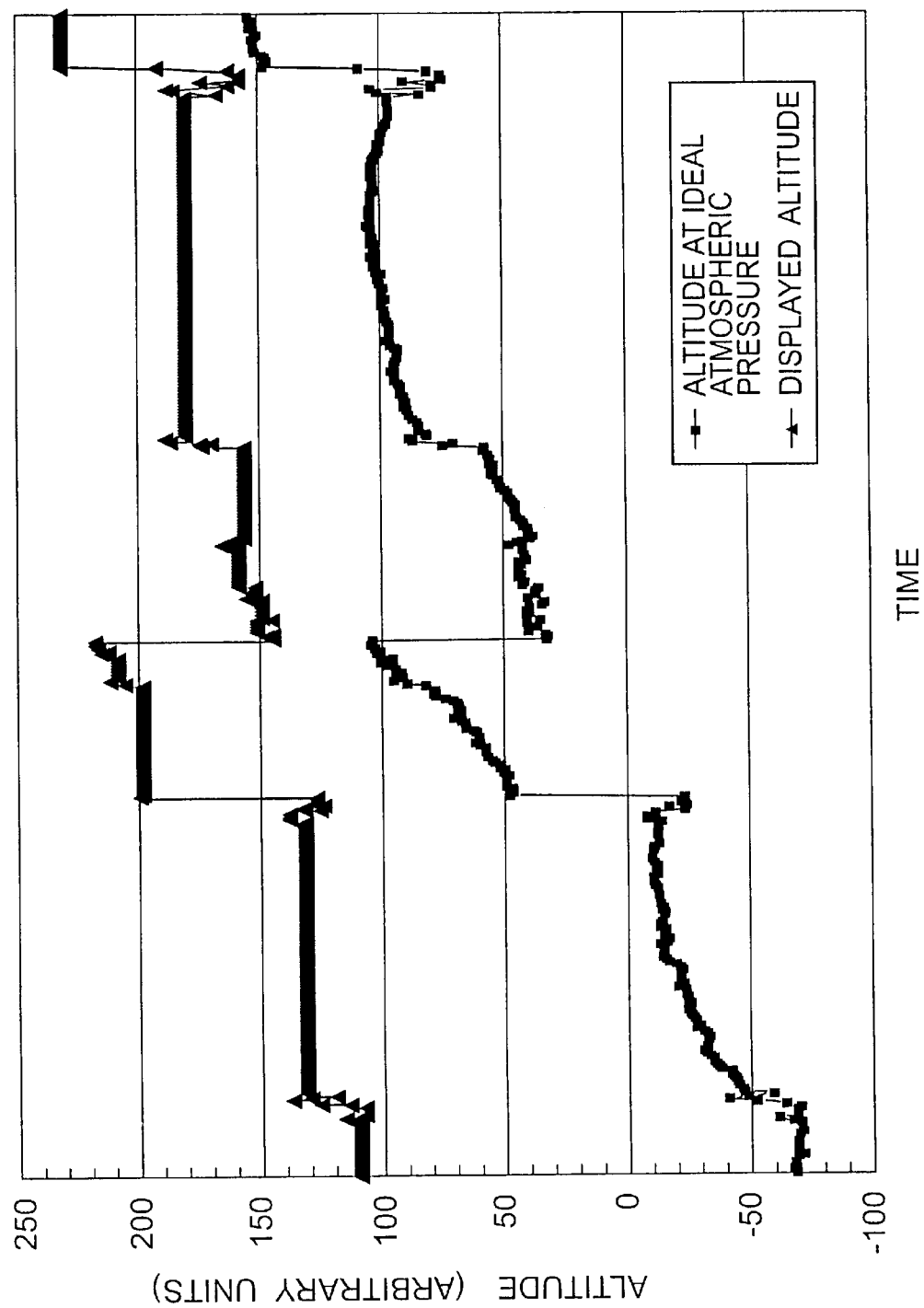
FIG. 4 is a graph showing a relationship between altitude at ideal atmospheric pressure and displayed altitude.
Figure 5:
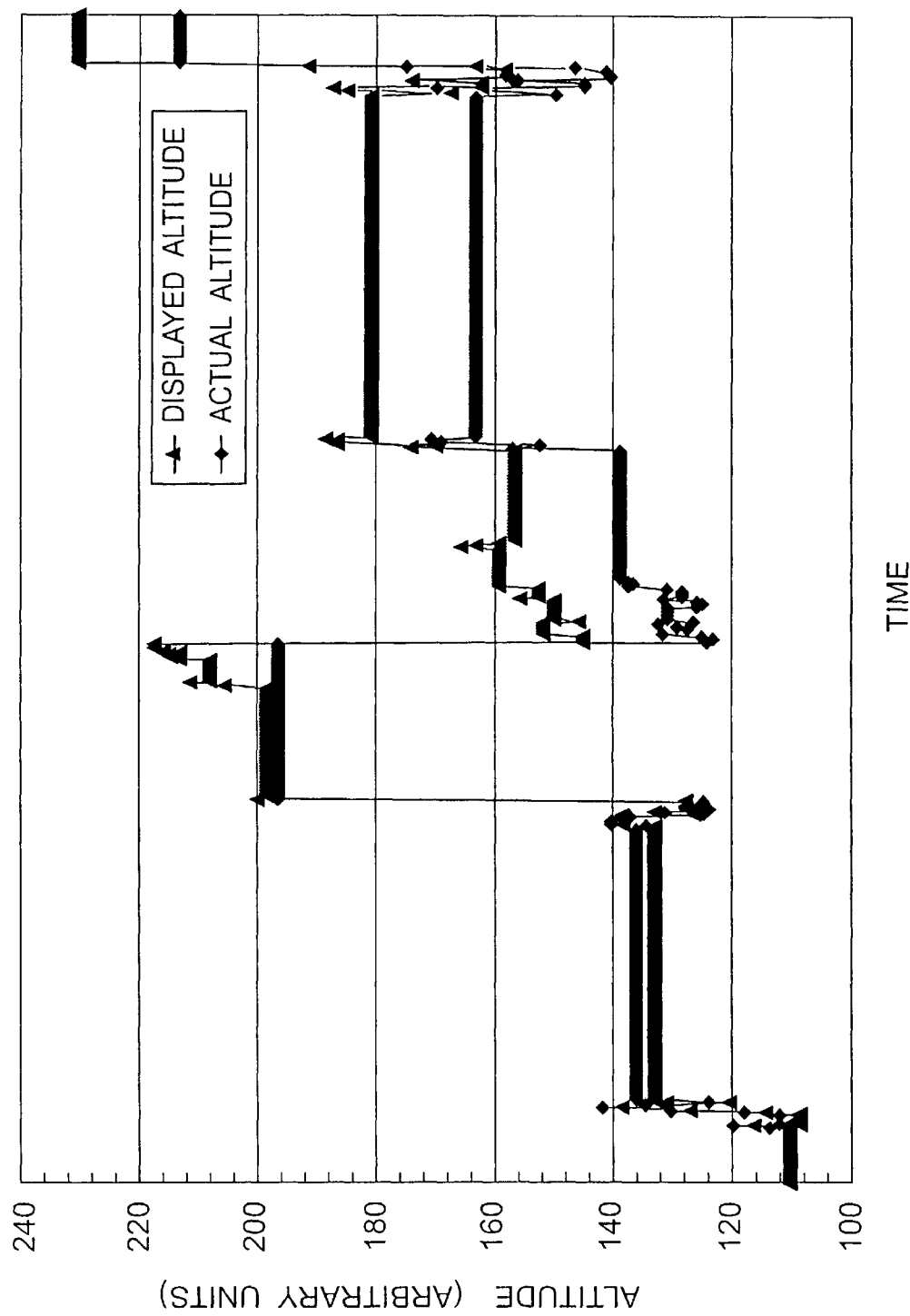
FIG. 5 is a graph showing a relationship between time, displayed altitude and actual altitude.

According to this process, determinations are made taking into consideration the situation up until that point in cases (cases lying between the intermediate range) where it is not clear whether the altimeter is at a standstill or moving and a much more accurate determination can therefore be achieved. The presence or absence of an actual change in altitude can therefore be precisely determined and highly accurate altitude measurements can be made. FIG. 4 is a graph showing the relationship between time (horizontal axis), ideal atmospheric altitude and displayed altitude (vertical axis). As shown in FIG. 4, the ideal atmospheric altitude and the displayed altitude obtained with this process are substantially different, and the ideal atmospheric altitude is substantially corrected with this process. Further, FIG. 5 is a graph showing the relationship between time (horizontal axis), displayed altitude and actual altitude (vertical axis). As shown in FIG. 5, the displayed altitude obtained with this process is a value close to the actual altitude and it can be understood that altitude measurements are made to a high degree of precision.

In the description up to this point, the mode is determined by comparing the amount of change in altitude with each threshold value, etc. However, the mode can also be determined using amounts of change in pressure rather than changes in altitude. Namely, an amount of change in atmospheric pressure itself (amount of change in pressure) is calculated prior to performing an altitude calculation. The standstill threshold value 20 and the movement threshold value 30 are then set with respect to this change in atmospheric pressure and the mode is determined by comparing the threshold values and the change in atmospheric pressure. In this case, it is preferable to calculate the altitude from the atmospheric pressure only when the moving mode is set, which reduces amount of calculation.

The process flow shown in FIG. 2 is only given as an example, and an arbitrary process flow where the amount of change in altitude (or an amount of change in atmospheric pressure) is compared with the standstill threshold value 20 and the movement threshold value 30 which is capable of continuing the mode set on the previous occasion when the amount of change in altitude falls within the intermediate range can be adopted.

Second Embodiment

FIG. 2 is a block view of essential parts of the configuration of a portable altimeter of a second embodiment. The fundamental configuration of this second embodiment is the same as for the first embodiment and is a portable altimeter for correcting displayed altitude while considering the tendency of the pressure. In particular, aspects of the configuration and process which are not described are the same as for the first embodiment and identical aspects of the configuration and process are given the same numerals.

Figure 6:
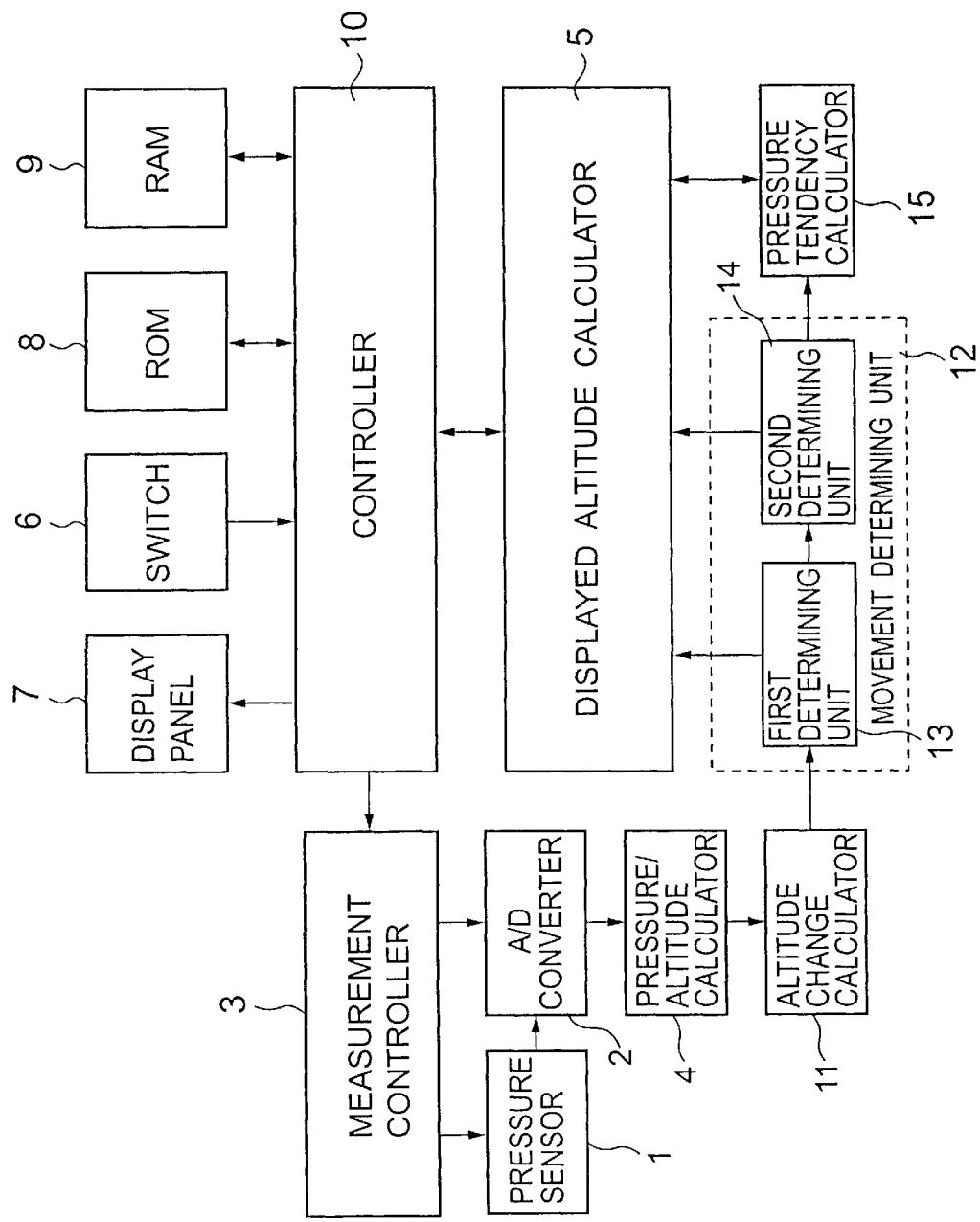
FIG. 6 is a block view of the configuration of essential parts of a portable altimeter of a second embodiment of the present invention.

In FIG. 6, a pressure tendency calculator 15 is provided at the movement determining unit 12 of the altimeter. This pressure tendency calculator 15 is for obtaining a pressure tendency occurring during standstill mode. Specifically, the pressure tendency calculator 15 calculates an amount of change in atmospheric pressure based on the pressure acquired during standstill mode and calculates a mean value for an amount of atmospheric pressure change (a trend in the amount of change of pressure) a prescribed number of times. In moving mode, correction of the displayed altitude is carried out based on the trend in the amount of change in atmospheric pressure and finally a displayed altitude is obtained.

Figure 7:
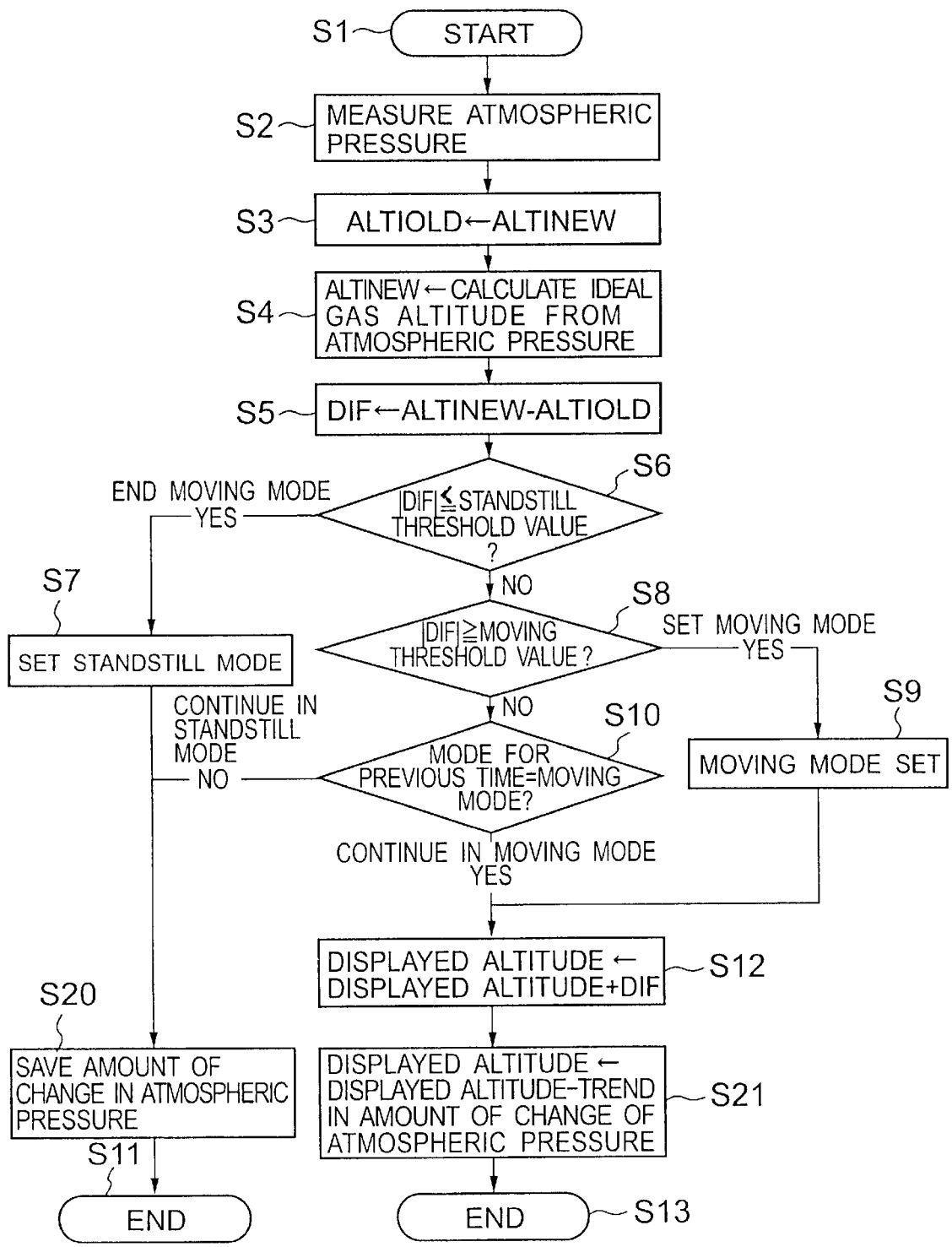
FIG. 7 is a flowchart of an altitude measuring process of the second embodiment.

FIG. 7 shows a flowchart of the altitude measuring process of this embodiment. In step S7 in FIG. 7, an amount of change in atmospheric pressure is calculated by the pressure tendency calculator 15 each time the standstill mode is set. Namely, the difference between the atmospheric pressure obtained in step S2 of the process and the atmospheric pressure obtained in step S2 of the processing cycle on the previous occasion is obtained and stored in the RAM 9 as the amount of change in atmospheric pressure (step S20). At the RAM 9, a memory region is maintained for holding the amount of change in atmospheric pressure for a prescribed number of times. When the number of times step S7 is repeated becomes substantial so that the number of times the amount of change in atmospheric pressure is acquired exceeds the prescribed number of times, the oldest amounts of change in atmospheric pressure are over-written by the newest amounts of change in atmospheric pressure. For example, twelve memory regions TR1 to TR12 are maintained in the RAM 9. The amount of change in atmospheric pressure obtained the first time is then held in TR1, and the amount of change in atmospheric pressure obtained the twelfth time is held in TR12, with TR1 then being overwritten with the change in atmospheric pressure obtained on the thirteenth occasion. This manner of holding the changes in atmospheric pressure using memory shifts is, however, merely provided as an example, and any arbitrary method where changes in atmospheric pressure for at least a prescribed number of times are held may be adopted.

In step S9 of the subsequent processing cycle, when moving mode is set, or when moving mode is continued via step S10, the average value of the change in atmospheric pressure up to this point (trend in the amount of change in atmospheric pressure) is obtained at the pressure tendency calculator 15 (step S21) after the displayed altitude is calculated in step S12. Namely, the amounts of change in atmospheric pressure for the prescribed number of times held in the RAM 9 are called by the pressure tendency calculator 15 and an average value is calculated for these values. For example, the amounts of change in pressure of TR1 to TR12 are added and divided by twelve to give an amount of change in pressure trend.

This amount of change in atmospheric pressure trend is outputted to the displayed altitude calculator 5 and correction of the displayed altitude obtained in step S12 is then carried out at the displayed altitude calculator 5, i.e. a final displayed altitude is calculated (also in step S21) by subtracting the amount of change in pressure trend from the displayed altitude obtained in step S12, and the process then ends (step S13).

Figure 8:
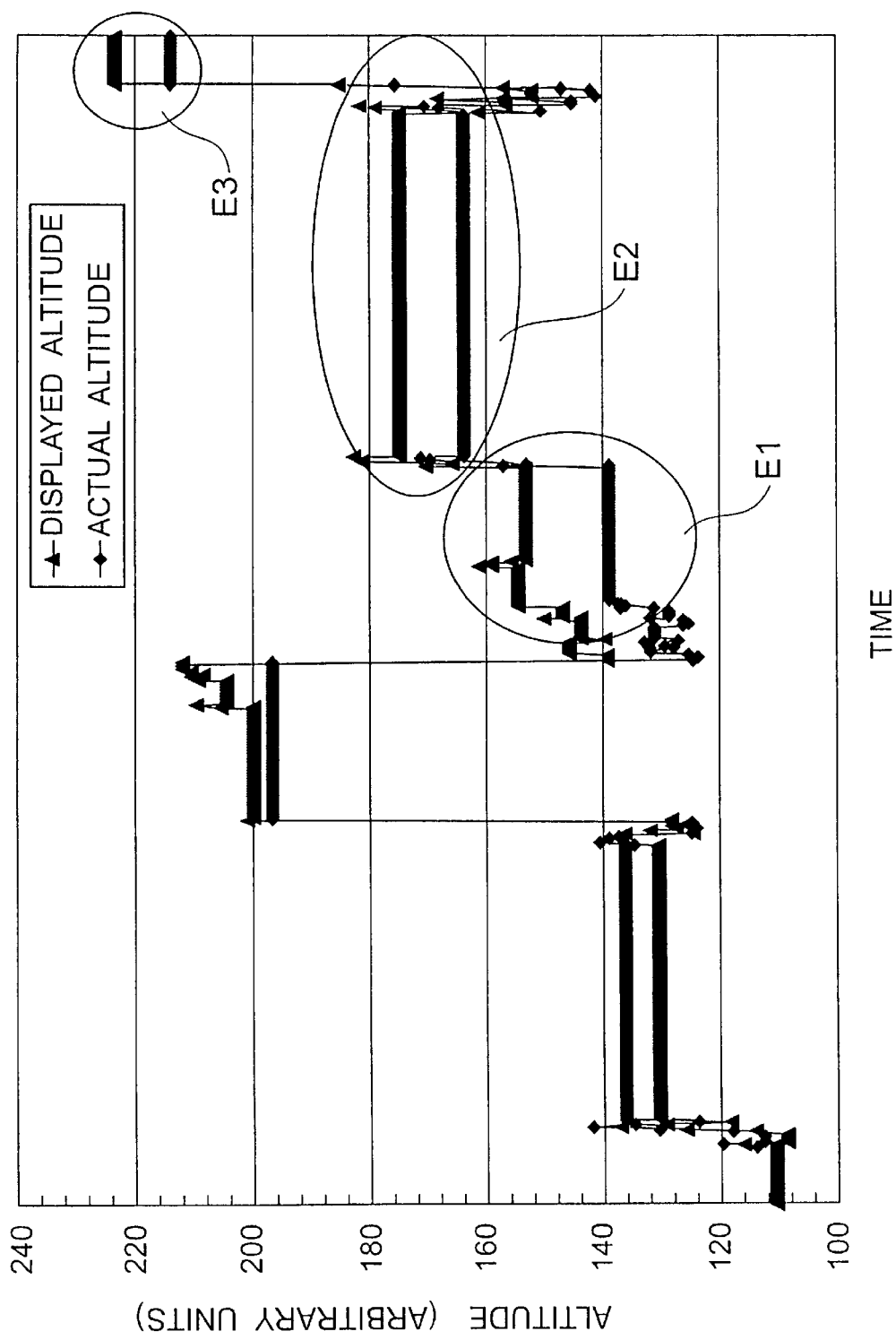
FIG. 8 is a graph showing a relationship between time, displayed altitude and actual altitude.

According to this processing, the tendency of the change in atmospheric pressure in standstill mode is taken into consideration and correction of the displayed altitude is then carried out to give much more precise altitude measurements. FIG. 8 is a graph showing the relationship between time (horizontal axis), displayed altitude and actual altitude (vertical axis). As shown in FIG. 8, the displayed altitude obtained with this process is a value close to the actual altitude. Further, by making a comparison with the first embodiment shown in FIG. 5 that in the areas E1 to E3 of FIG. 8 altitudes which are particularly close to the actual altitude are obtained.

Third Embodiment

Figure 9:
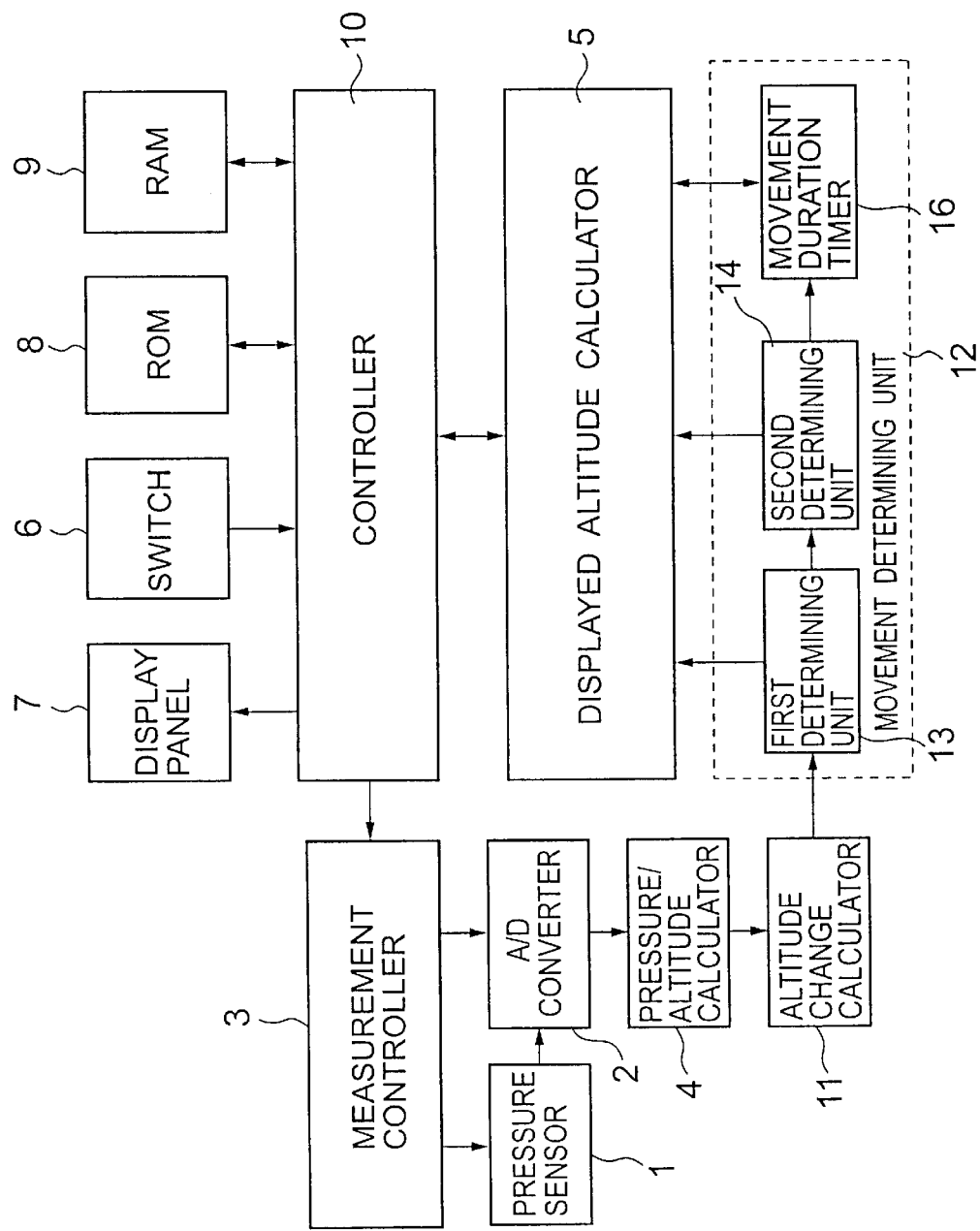
FIG. 9 is a block view of the configuration of essential parts of a portable altimeter of a third embodiment of the present invention.

FIG. 9 is a block view of essential parts of the configuration of a portable altimeter of a third embodiment. The fundamental configuration of this second embodiment is the same as for the first embodiment and is a portable altimeter for calculating displayed altitude while considering time durations within an intermediate range under moving mode. In particular, aspects of the configuration and process which are not described are the same as for the first embodiment and identical aspects of the configuration and process are given the same numerals.

In FIG. 9, a movement duration timer 16 is provided at the movement determining unit 12 of the altimeter. This movement duration timer 16 is for measuring the lengths of durations) for which the amount of change in altitude is positioned continuously within the intermediate range when moving mode is set. Such duration lengths can be measured as specific times (number of continuous intermediate times) or as a number of times (a number of continuous intermediate times). In this embodiment, the movement duration timer 16 counts a number of continuous intermediate times. When this number of continuous intermediate times corresponds to a prescribed reference number of times in moving mode, it is determined that the altimeter has come to a standstill, and standstill mode is set.

Figure 10:
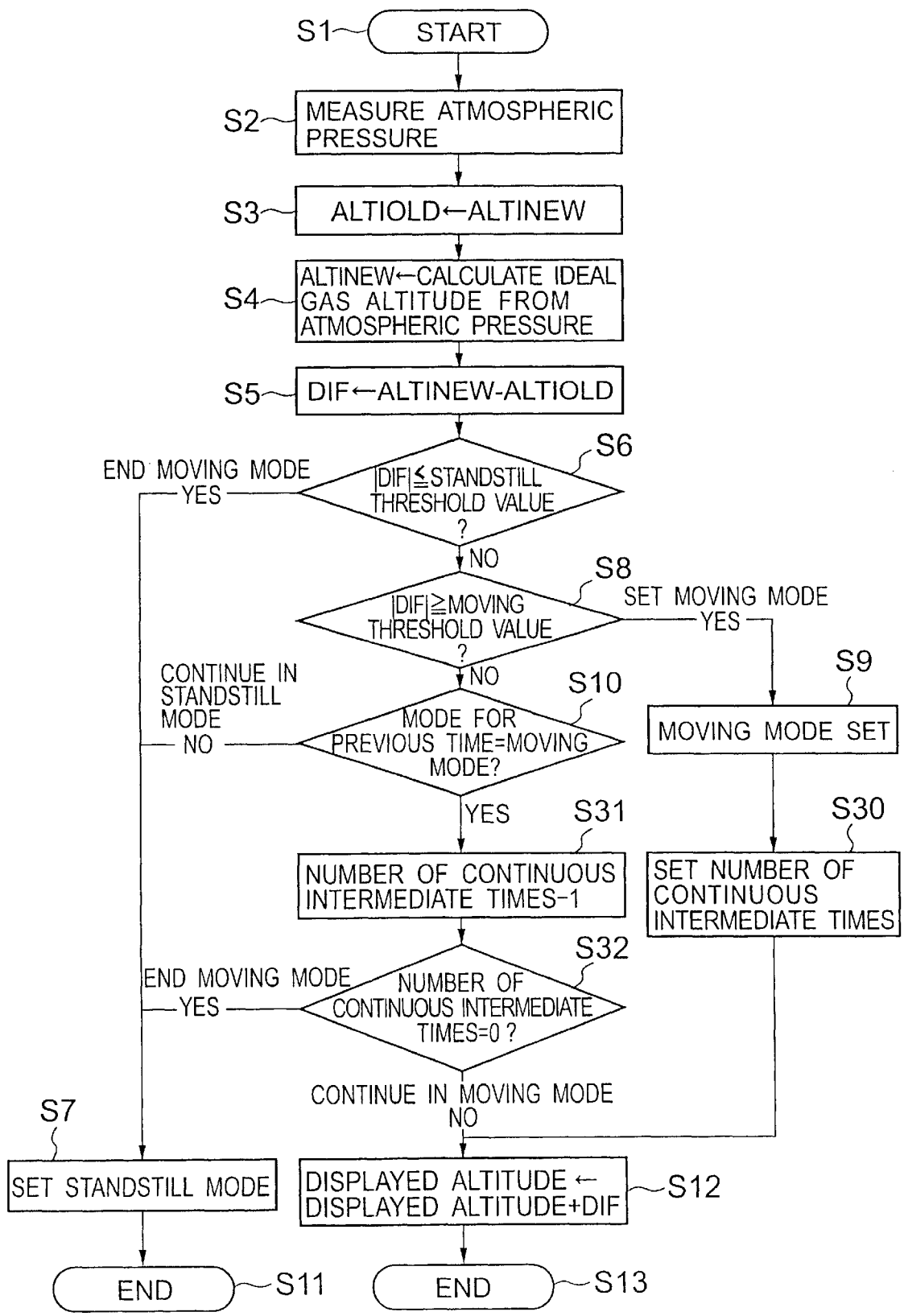
FIG. 10 is a flowchart of an altitude measuring process of the third embodiment.

FIG. 10 shows a flowchart of an altitude measuring process of this embodiment. In this flowchart, the number of continuous intermediate times is counted by the movement duration timer 16, i.e. when moving mode is set in step S9 of FIG. 10, a prescribed initial value (which in this case is 3) is set as the number of continuous intermediate times (step S30). After this, a prescribed reduction number (which in this case is 1) is subtracted from the number of continuous intermediate times (step S31) every time moving mode is determined in step S10, i.e. every time a position is determined to be within the intermediate range. It is then determined whether or not the number of continuous intermediate times coincides with the prescribed reference number of times (which in this case is zero) (step S32). When this is not the case, moving mode is continued as is, step S12 is proceeded to, and the displayed altitude is calculated. When there is coincidence, step S7 is proceeded to and standstill mode is forcibly set.

According to this process, when moving mode is set, the amount of change in altitude continues to be in the intermediate range without reaching to as far as the standstill threshold value 20, the altimeter is determined to be at a standstill, and the displayed altitude can be updated. Altitude precision is therefore further improved in addition to the results of the first embodiment.

Rather than using the number of continuous intermediate times, it is also possible to use continuous intermediate durations. In this case, mode setting is carried out by comparing the continuous intermediate durations with a prescribed duration. Specific counting or timing methods for the number of continuous intermediate times or the continuous intermediate durations, and the content of the prescribed reference number of times or prescribed subtraction umber can be decided arbitrarily.

Fourth Embodiment

Figure 11:
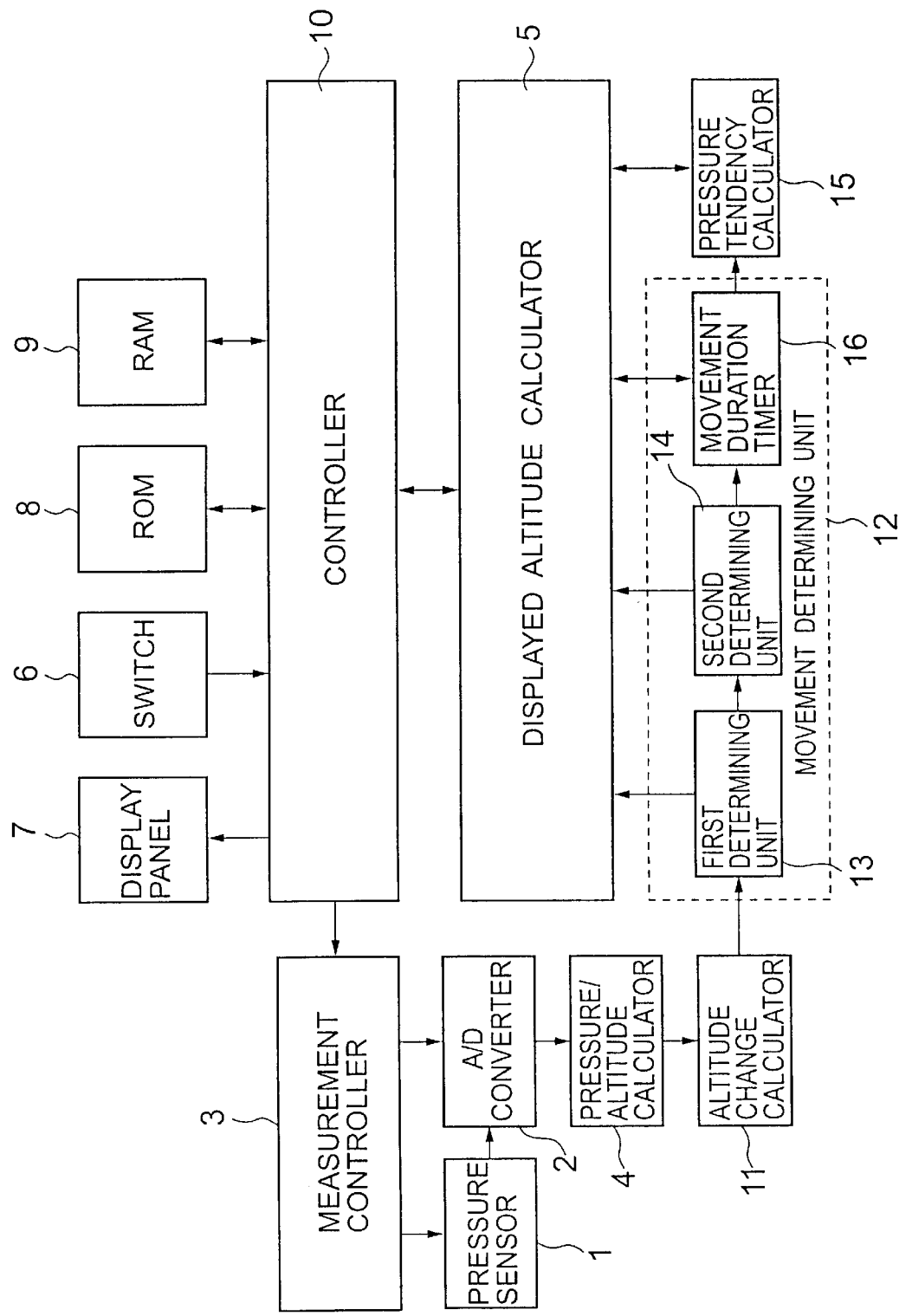
FIG. 11 is a block view of the configuration of essential parts of a portable altimeter of a fourth embodiment of the present invention.
Figure 12:
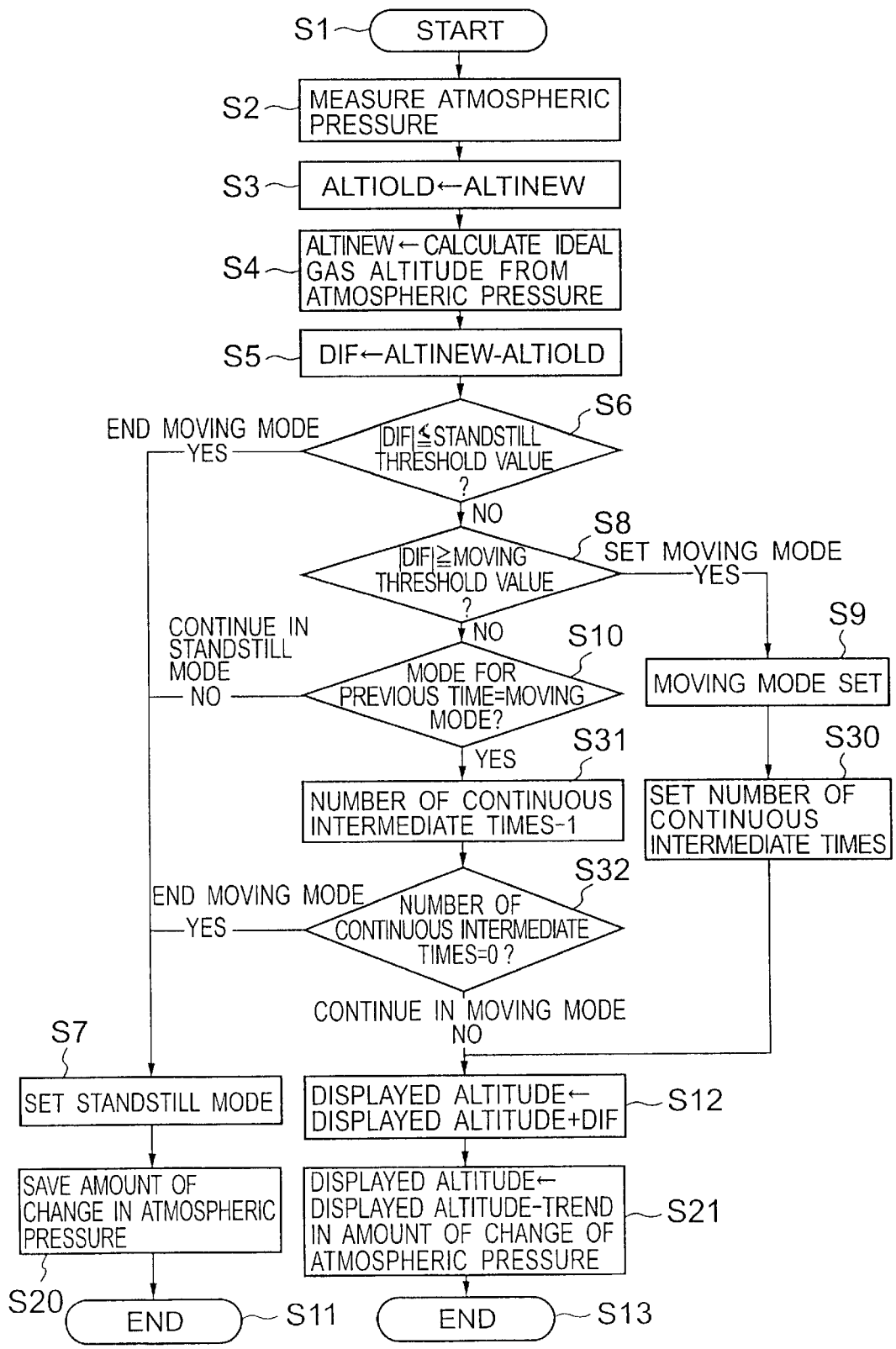
FIG. 12 is a flowchart of an altitude measuring process of the fourth embodiment.

FIG. 11 is a block view of essential parts of the configuration of a portable altimeter of a fourth embodiment, and FIG. 12 shows a flowchart of an altitude measuring process of this embodiment. The fundamentals of this embodiment are basically the same as those of the first embodiment, but this embodiment is also provided with the characteristic elements of the second and third embodiments. In particular, aspects of the configuration and process which are not described are the same as for the first to third embodiments and identical aspects of the configuration and process are given the same numerals.

In FIG. 11, the pressure tendency calculator 15 and the movement duration timer 16 are provided at the movement determining unit 12 of the altimeter. Step S20 and step S21 of the altitude measuring process shown in FIG. 12 carry out correction taking into consideration pressure tendency via the pressure tendency calculator 15 as with the second embodiment. Mode setting is then carried out in steps S30, S31 and S32 taking into consideration the number of continuous intermediate times occurring in moving mode via the movement duration timer 16.

According to this process, the effects of the second and third embodiment are also obtained in addition to the effects of the first embodiment and extremely precise altitude measurements are therefore achieved.

Fifth Embodiment

Figure 13:
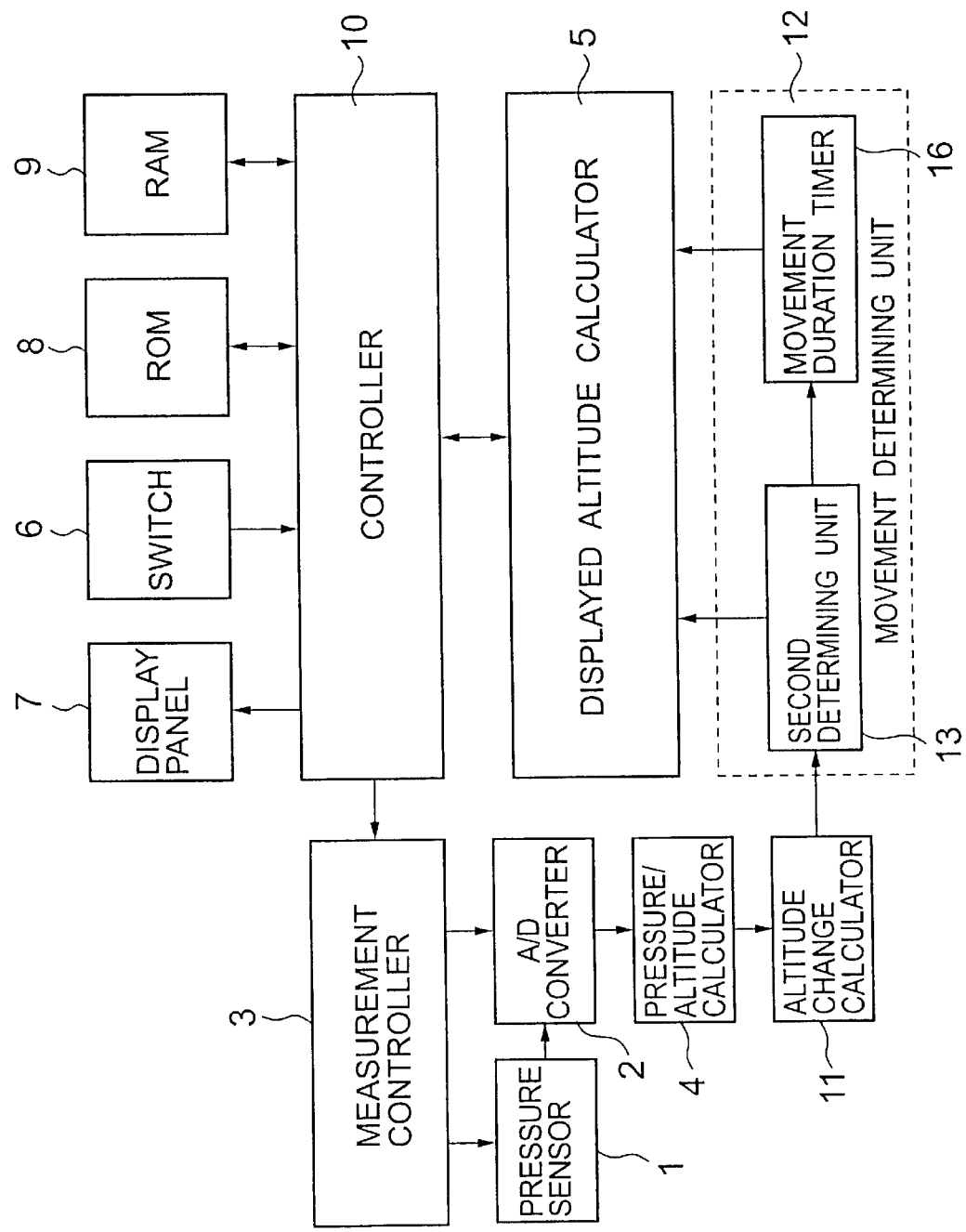
FIG. 13 is a block view of the configuration of essential parts of a portable altimeter of a fifth embodiment of the present invention.
Figure 14:
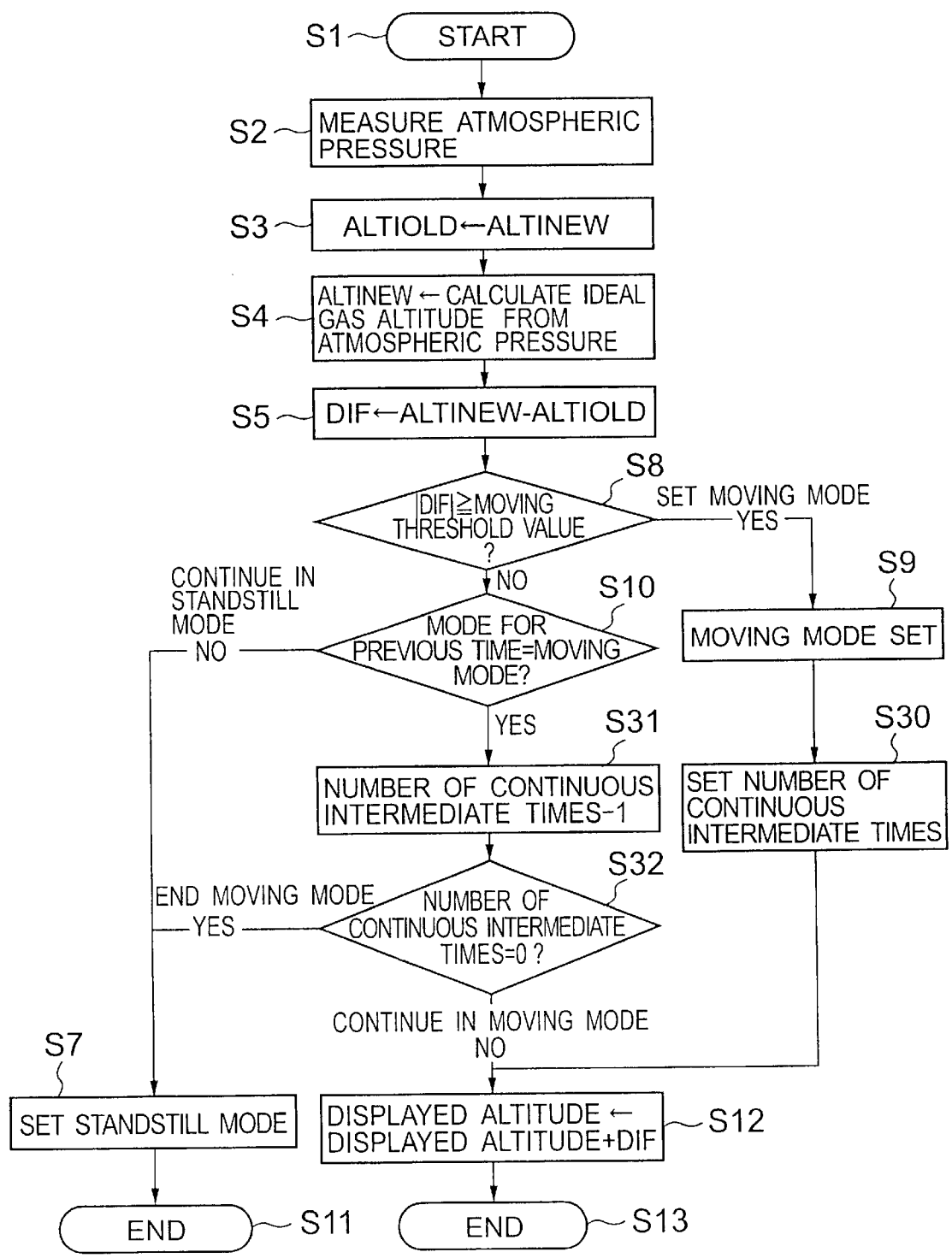
FIG. 14 is a flowchart of an altitude measuring process of the fifth embodiment.

FIG. 13 is a block view of essential parts of the configuration of a portable altimeter of a fifth embodiment, and FIG. 14 shows a flowchart of an altitude measuring process of this embodiment. The fundamental configuration of the portable altimeter of this embodiment is as for the third embodiment shown in FIG. 9, with the first determining unit 13 of the movement determining unit 12 omitted. In particular, aspects of the configuration and process which are not described are the same as for the third embodiment and identical aspects of the configuration and process are given the same numerals.

Figure 15:
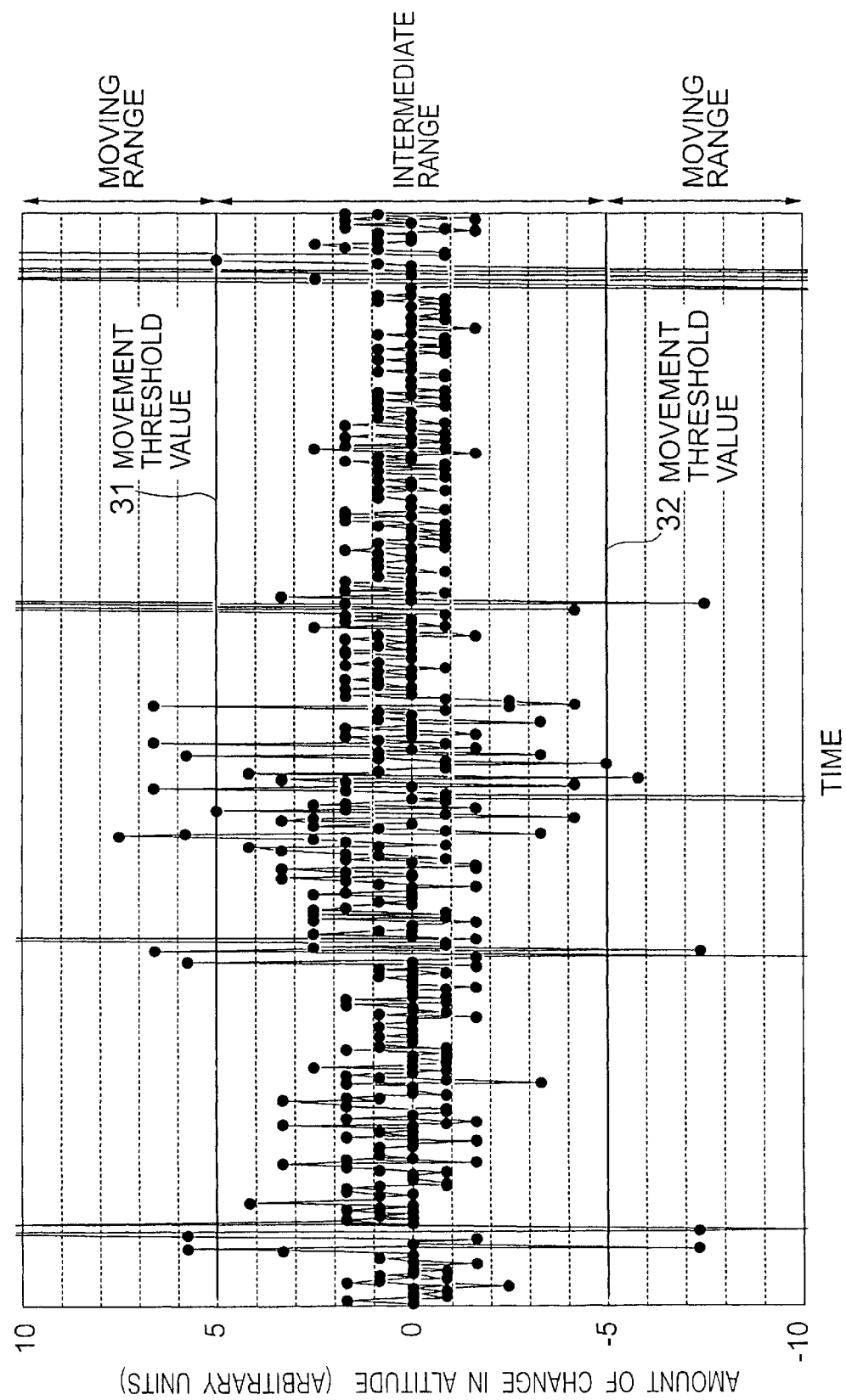
FIG. 15 is a graph showing a relationship between time and amount of change in altitude.

Only the movement threshold value 30 is set as a threshold voltage constituting a determination reference for the movement determining unit 12 with this altimeter, and the standstill threshold value 20 is omitted. In this embodiment, the intermediate range can be considered to have a greater overall range smaller than the plus side movement threshold value 31 and greater than the minus side movement threshold value 32 (a range that is the a combination of a range from more than the plus movement threshold value 21 to less than the minus movement threshold value 32 of the first embodiment, and the intermediate range). FIG. 15 is a graph showing the relationship between time (horizontal axis) and change in altitude (vertical axis). In FIG. 15, the movement threshold value 30 is set to a plus side 31 and a minus side 32 taking an amount of change in altitude=0 as a reference. The intermediate range is then a single continuous range positioned between the movement threshold value 30.

With the above configuration, the altitude measuring process shown in FIG. 14 is carried out with step S6 of the process shown in FIG. 10 omitted, namely, after step S5, a determination is made at the second determining unit 14 as to whether or not the absolute value of the amount of change in altitude is greater than or equal to the movement threshold value 30 (step S8). Moving mode is set (step S9) when the absolute value of the amount of change in the altitude is greater than or equal to the movement threshold value 30 and an initial value for the number of continuous intermediate times is set (step S30).

In another processing cycle thereafter, when it is determined in step S8 that the absolute value of the amount of change in altitude is greater than or equal to the movement threshold value 30, a determination is made as to whether or not the mode set in the altitude measuring process for the previous time is the standstill mode or the moving mode (step S10), and this mode is then continued as a rule. However, when moving mode continues, the prescribed reduction number of 1 is subtracted from the number of continuous intermediate times (step S31) and a determination is made as to whether or not this number of continuous intermediate times coincides with a prescribed reduction number of one (step S32). When there is no coincidence, moving mode continues as is, but when there is coincidence, standstill mode is set in place of moving mode (step S7).

Figure 16:
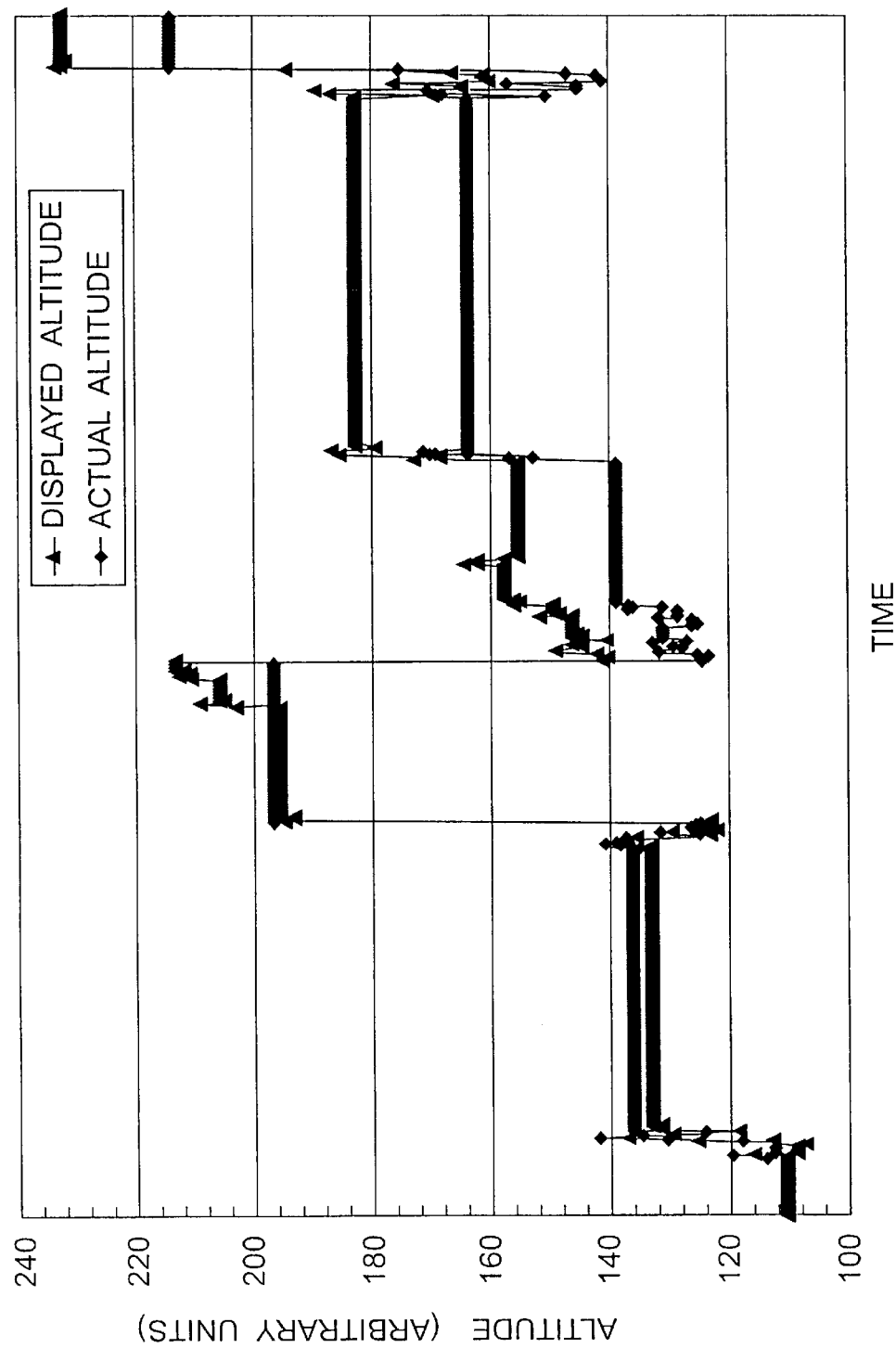
FIG. 16 is a graph showing a relationship between time, displayed altitude and actual altitude.

Even with this process, the altimeter can be determined to be at a standstill and the displayed altitude can be updated when the amount of change in altitude is continuously positioned within an intermediate range in moving mode, and altitude precision can therefore be improved. FIG. 16 is a graph showing the relationship between time (horizontal axis), displayed altitude and actual altitude (vertical axis). As shown in FIG. 16, the displayed altitude obtained with this process is a value close to the actual altitude and it is clear that substantially the same precision as for the first embodiment shown in FIG. 5 is obtained.

Sixth Embodiment

Figure 17:
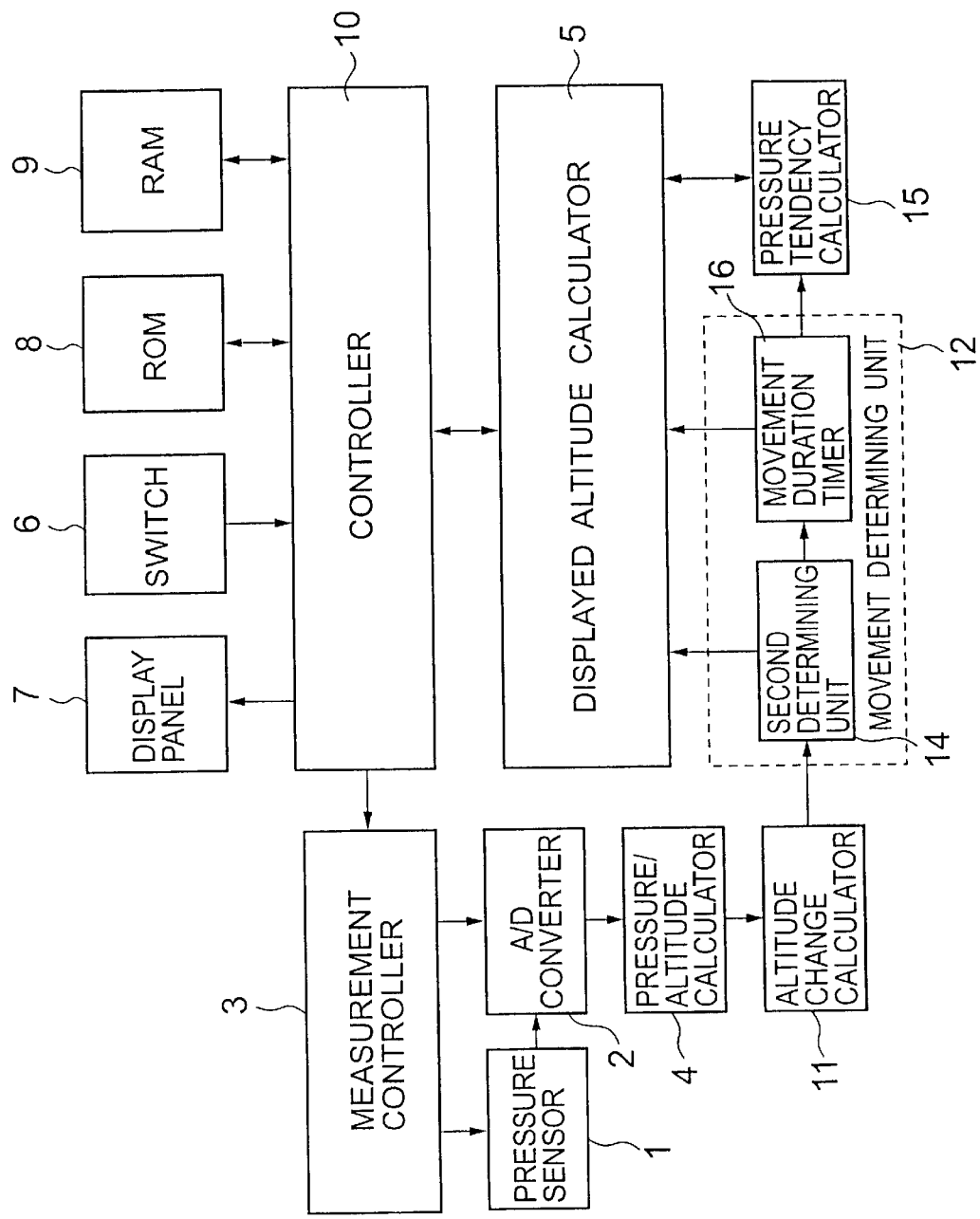
FIG. 17 is a block view of the configuration of essential parts of a portable altimeter of a sixth embodiment of the present invention.
Figure 18:
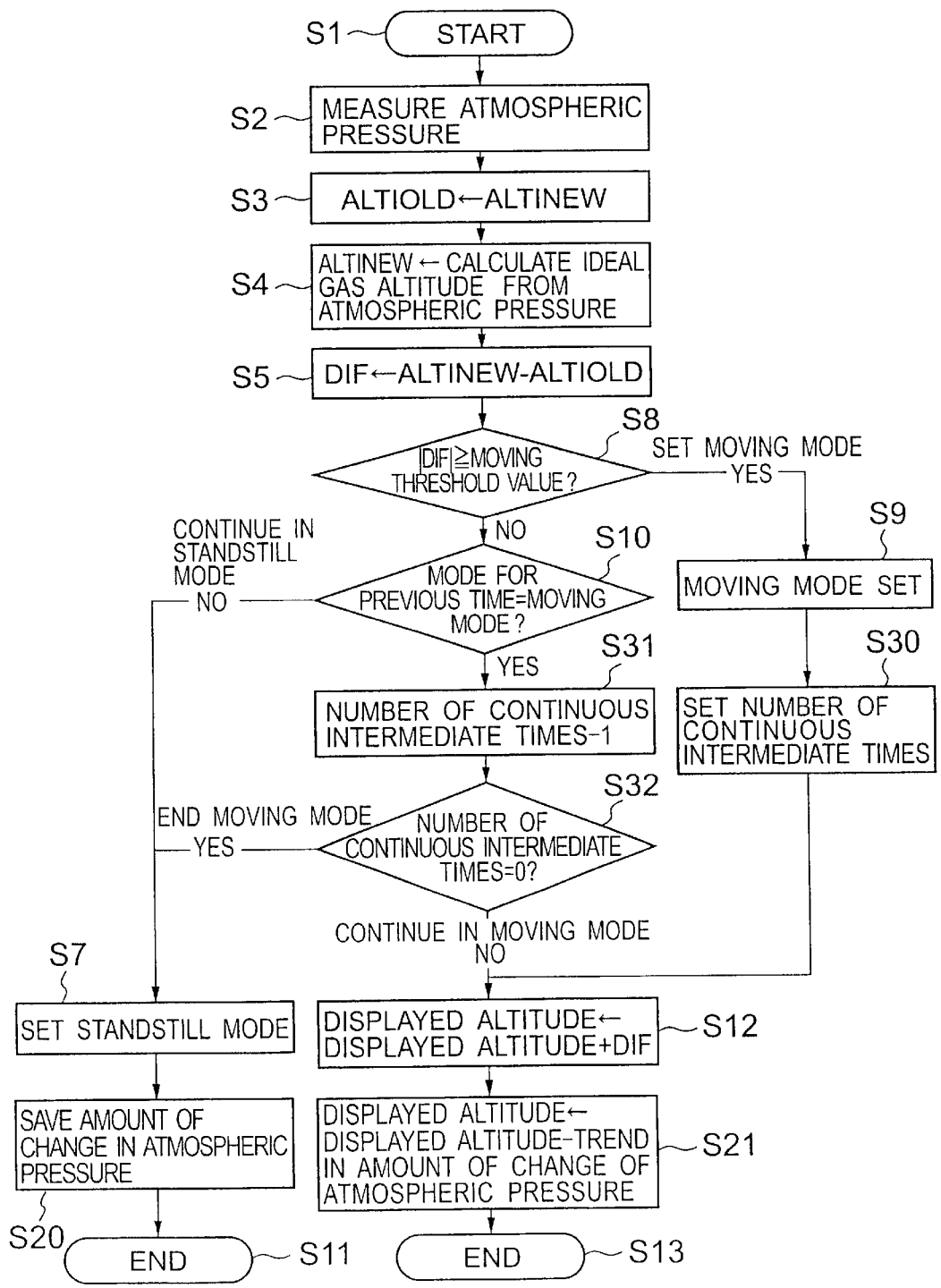
FIG. 18 is a flowchart of an altitude measuring process of the sixth embodiment.

FIG. 17 is a block view of essential parts of the configuration of a portable altimeter of a sixth embodiment, and FIG. 18 shows a flowchart of an altitude measuring process of this embodiment. The fundamentals of this embodiment are basically the fifth embodiment shown in FIG. 13, but this embodiment is also provided with the pressure tendency calculator 15 as with the second embodiment (alternatively, the portable altimeter may have a basic configuration as in the fourth embodiment shown in FIG. 11, with the first determining unit 13 of the movement determining unit 12 omitted). In particular, aspects of the configuration and process which are not described are the same as for the second, fourth and fifth embodiments and identical aspects of the configuration and process are given the same numerals.

In FIG. 17, the pressure tendency calculator 15 and the movement duration timer 16 are provided at the movement determining unit 12 of the altimeter. With the above configuration, the altitude measuring process shown in FIG. 18 is carried out with step S6 of the process shown in FIG. 12 omitted, i.e. in step S20 and S21, correction is carried out taking into consideration the pressure tendency via the pressure tendency calculator 15, etc. Mode setting is then carried out in steps S30, S31 and S32 taking into consideration the number of continuous intermediate times occurring in moving mode via the movement duration timer 16, etc.

Figure 19:
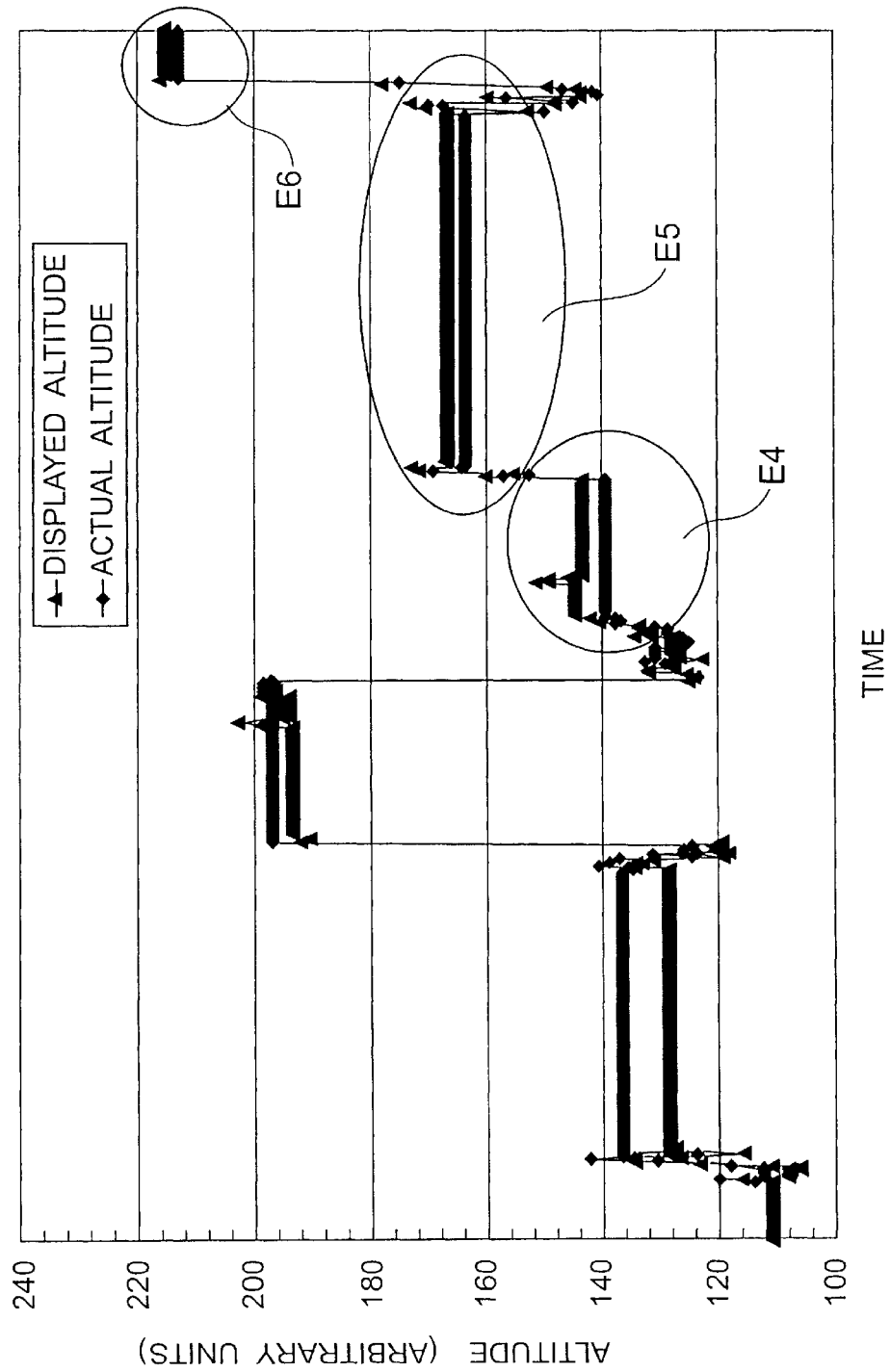
FIG. 19 is a graph showing a relationship between time, displayed altitude and actual altitude.

According to this processing, in addition to the results of the fifth embodiment, the tendency of the change in atmospheric pressure in standstill mode is taken into consideration and correction of the displayed altitude is then carried out to give much more precise altitude measurements. FIG. 19 is a graph showing the relationship between time (horizontal axis), displayed altitude and actual altitude (vertical axis). As shown in FIG. 19, the displayed altitude obtained with this process is a value close to the actual altitude, and particularly when compared with the fifth embodiment shown in FIG. 16, it is clear that an altitude extremely close to the actual altitude is obtained for the areas 4 to 6.

Seventh Embodiment

Figure 20:
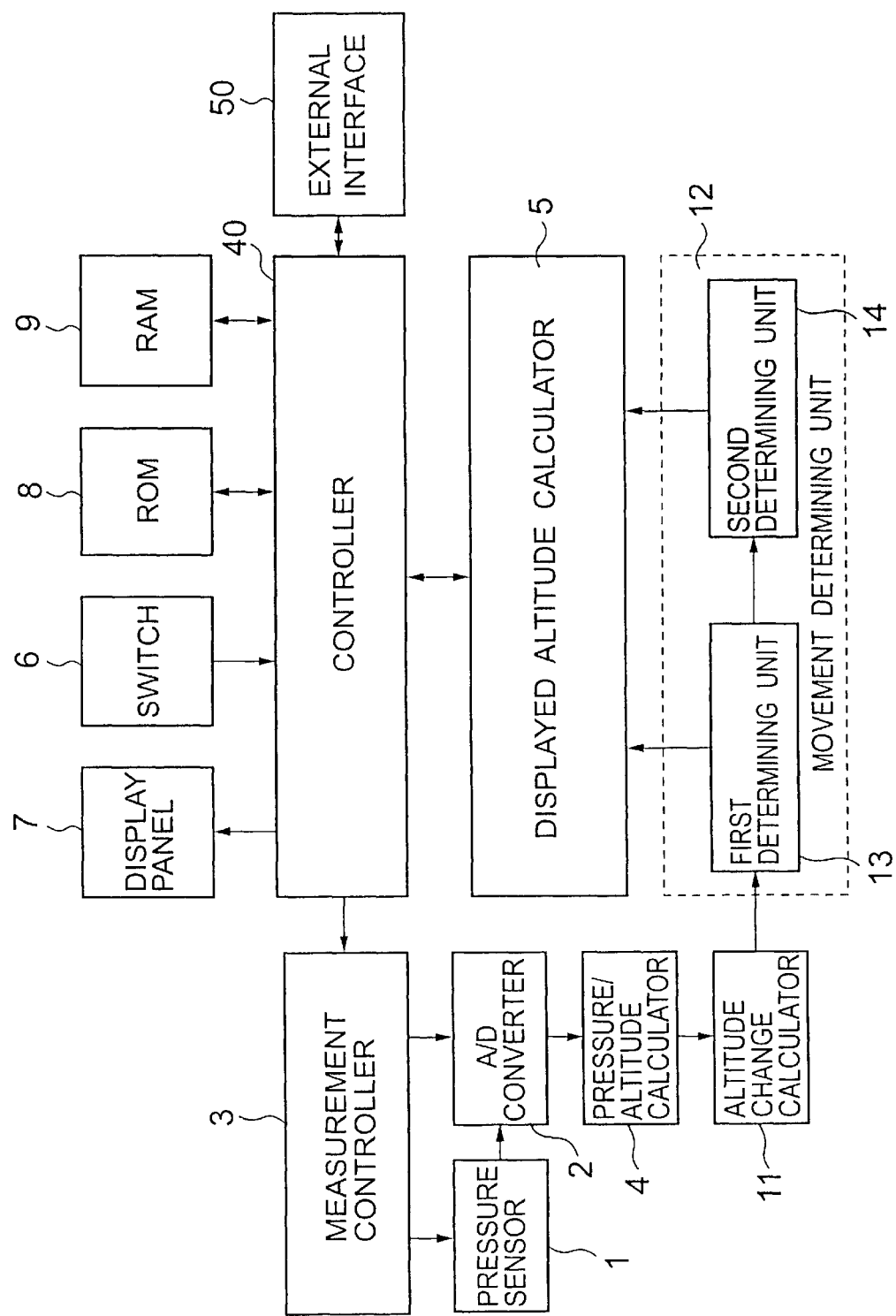
FIG. 20 is a block view of the configuration of essential parts of a portable altimeter of a seventh embodiment.

FIG. 20 is a block view of essential parts of the configuration of a portable altimeter of a seventh embodiment. The fundamental configuration of this embodiment is the same as for the first embodiment and this embodiment is a portable altimeter that utilizes an altitude value acquired by the first embodiment to output information corresponding to user requirements. In particular, aspects of the configuration and process which are not described are the same as for the first embodiment and identical aspects of the configuration and process are given the same numerals.

In FIG. 20, a controller 40 of the altimeter has a function for the controller 10 of the first embodiment, processes altitude values calculated based on atmospheric pressure changing in accompaniment with actual movement of the user to the exclusion of the influence of atmospheric pressure changes due to atmospheric fluctuations, and has a function for making graphs that are easy for a user to intuitively understand and displaying the graphs on the display panel 7. This function is implemented by calling a program recorded in the ROM 8 and the RAM 9. An external interface 50 is connected to the controller 40. The external interface 50 is for connecting, for example, personal computers, other portable altimeters, and various information terminals and printers, etc., and is particularly for transferring graphs made by the controller 40.

Figure 21:
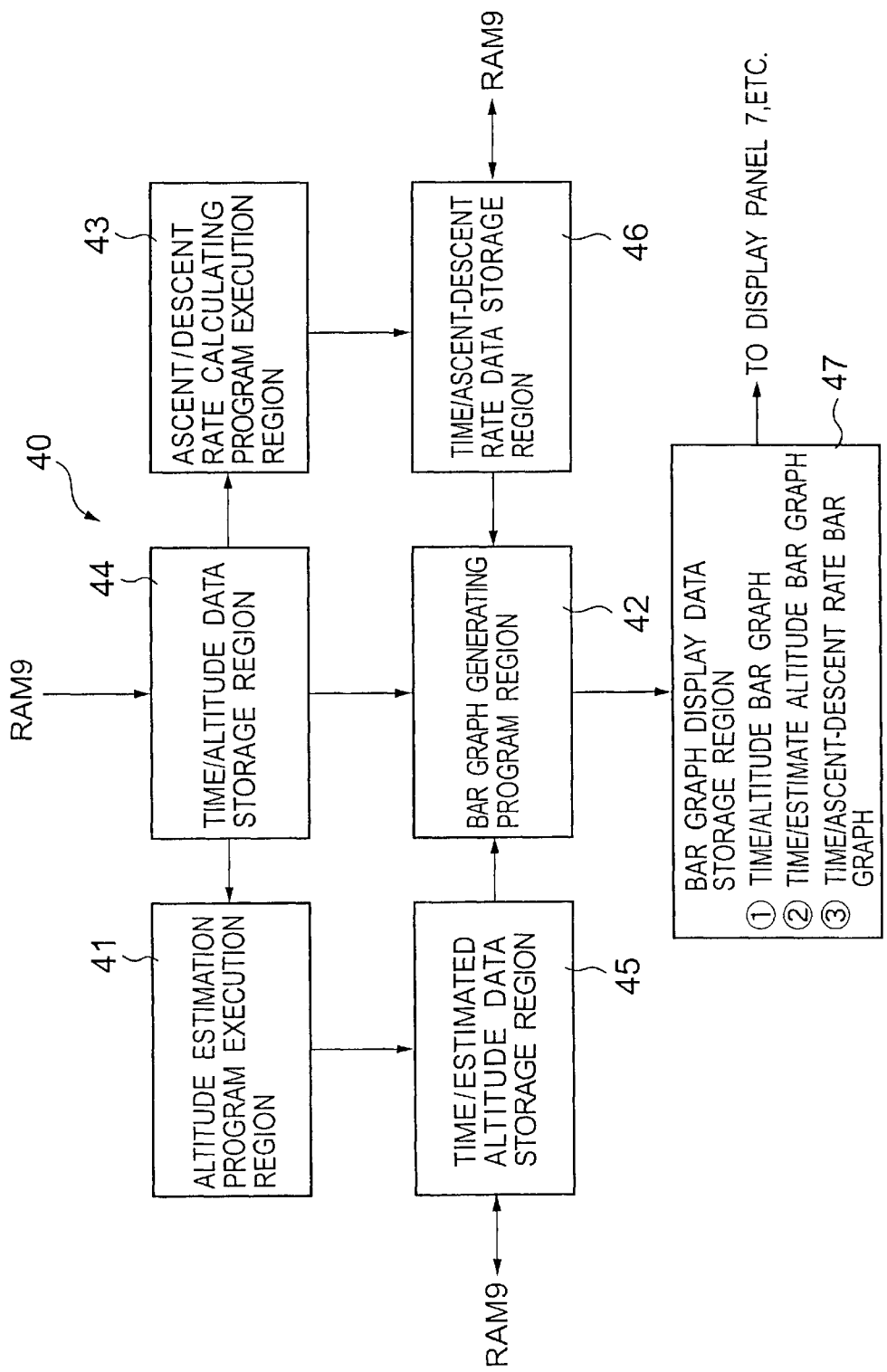
FIG. 21 is a block view showing a region maintained by a controller 40 for implementing functions of the seventh embodiment.

FIG. 21 is a block view showing a region maintained by the controller 40 for implementing the functions of the seventh embodiment. The controller 40 maintains an altitude estimation program execution region 41 for calling up various programs and data from the ROM 8 and RAM 9, a bar graph generating program region 42, an ascent/descent rate calculating program execution region 43, a time/altitude data storage region 44, a time/estimated altitude data storage region 45, a time/ascent-descent rate data storage region 46, and a bar graph display data storage region 47. Arrows in the drawings indicate flow of data.

The altitude estimation program estimates a rise (or fall) in altitude for each time based on the time/altitude data and outputs time/estimated altitude data. The bar graph generating program generates ① a time/altitude bar graph, ② a time/estimated altitude bar graph, and ③ an ascent/descent rate bar graph from the time/altitude data, the time/estimated altitude data, and the time/ascent-descent rate data, and displays these bar graphs on the display panel 7. Conditions for generating the bar graphs such as data for what size interval to display the bars at, etc., can be called from the RAM 9 as appropriate.

The ascent/descent rate calculating program outputs time/ascent-descent rate data based on the time/altitude data. The ascent/descent rate can be taken to be a ratio of items of altitude data preceding and following each other with respect to time, or alternatively, sampled altitude data can be divided into several blocks, estimates can be obtained for within these blocks, and ratios of estimation values for blocks preceding and following each other with respect to time can be taken as the ascent/descent rate.

FIG. 22 is a view showing an example of a concept for a data structure for the bar graph display data. FIG. 22A is display data for a time/altitude bar graph and is a data structure having label data such as flags for indicating the presence of a time/altitude bar graph, data for the date on which the time/altitude data was acquired, and a plurality of items of display length data of time data corresponding to the sampling period, altitude data sampled at this time, and the length of the scales on the display screen.

FIG. 22B is display data for a time/estimated altitude bar graph and is a data structure having label data such as flags for indicating the presence of a time/estimated altitude bar graph, data for the date on which the time/altitude data was acquired, and a plurality of items of display length data of time data corresponding to the sampling period, altitude data estimated at this time, and the length of the scales on the display screen.

FIG. 22C is display data for a time/ascent-descent rate bar graph and is a data structure having label data such as flags for indicating the presence of a time/ascent-descent rate bar graph, data for the date on which the time/altitude data was acquired, and a plurality of items of display length data of time data corresponding to the sampling period, ascent/descent rate data for this time, and the length of the scales on the display screen.

The following description is split up for ① the time/altitude bar graph, ② the time estimated altitude bar graph, and ③ the ascent/descent rate bar graph. FIG. 23 shows an example of a bar graph of the seventh embodiment, and FIG. 24 shows a comparative example of a bar graph for comparison with the bar graph of the seventh embodiment of FIG. 24.

FIG. 23 is an example of where a bar graph is generated based on time/altitude data for the case of the numerical values of FIG. 4 and FIG. 5 as described for the first embodiment. FIG. 24 shows an example of a bar graph generated based on the time/altitude data for the case of the numerical values of FIG. 4 and FIG. 5 described for the first embodiment for the case where each of the execution regions and storage regions for the seventh embodiment are maintained at the related controller described in FIG. 27, and is provided for comparison with FIG. 23. In FIG. 23 and FIG. 24, A is ① a time/altitude bar graph, B is ② a time/estimated altitude bar graph, and C is ③ an ascent/descent rate bar graph. In these graphs, the vertical axes are time, and the horizontal axes are altitude, estimated altitude, and ascent/descent rate.

Figure 23A:
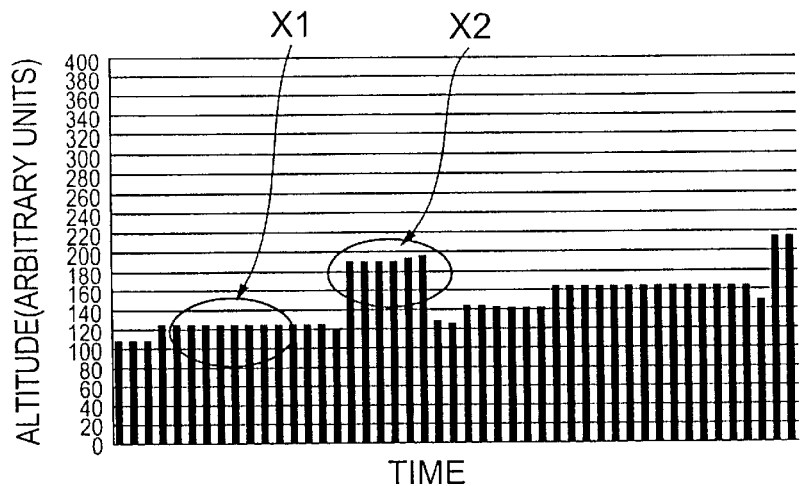
FIG. 23 show example bar graphs of the seventh embodiment.
Figure 24A:
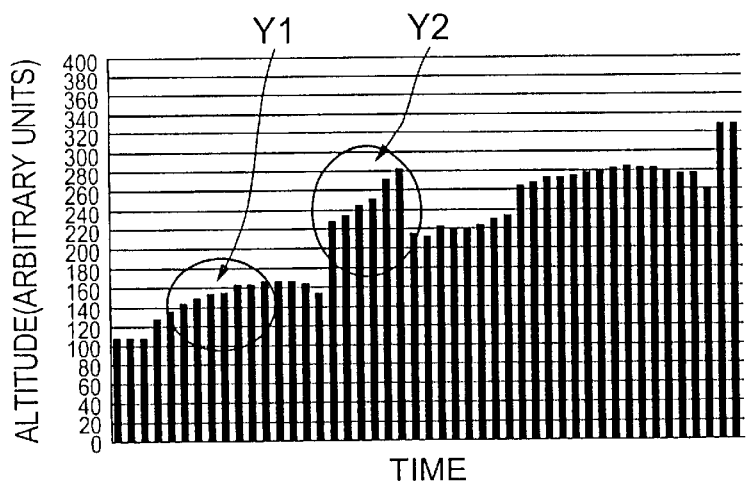
FIG. 24 show example bar graphs of a comparative example provided for comparison with the bar graph of the seventh embodiment.
Figure 24B:
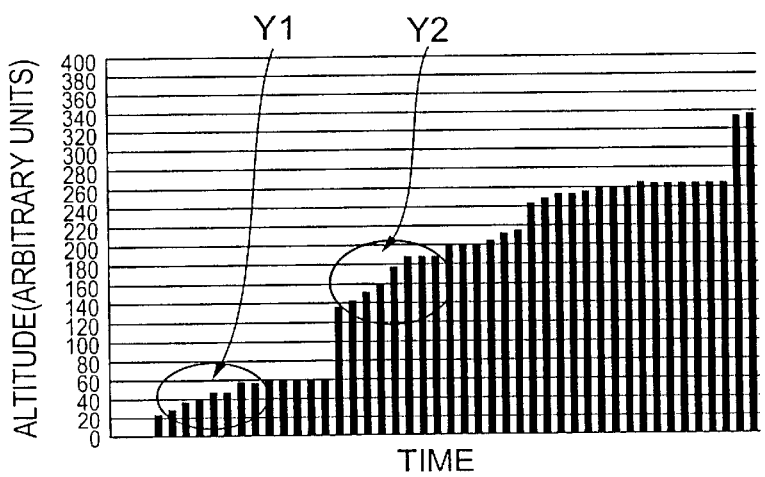
Figure 24C:
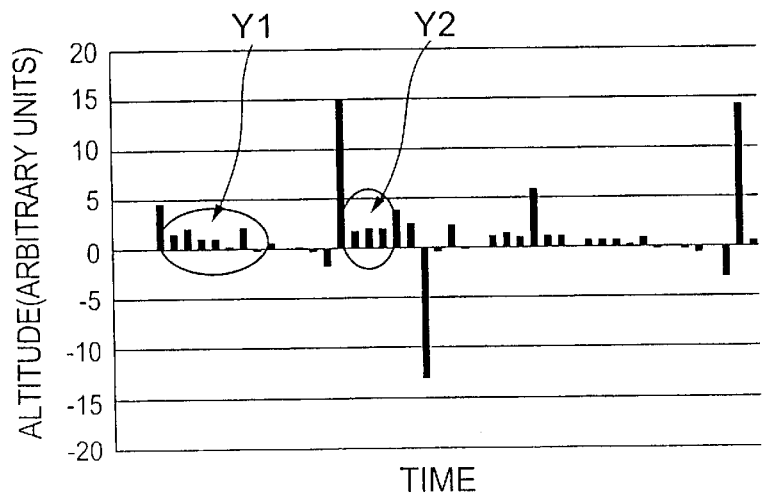

In the case of the time/altitude bar graph of ①, the bar graph of the seventh embodiment shown in FIG. 23A is generated based on time/altitude data where pressures due to atmospheric fluctuations are eliminated. Changes in altitude can therefore be accurately and intuitively understood compared with the bar graph in the comparative example shown in FIG. 24A. In, for example, the case of climbing mount Fuji, when the mountain is climbed at a steady pace the bar graph will accurately appear in the shape of a mountain and the user will feel the satisfaction of having reached the summit.

Figure 23B:
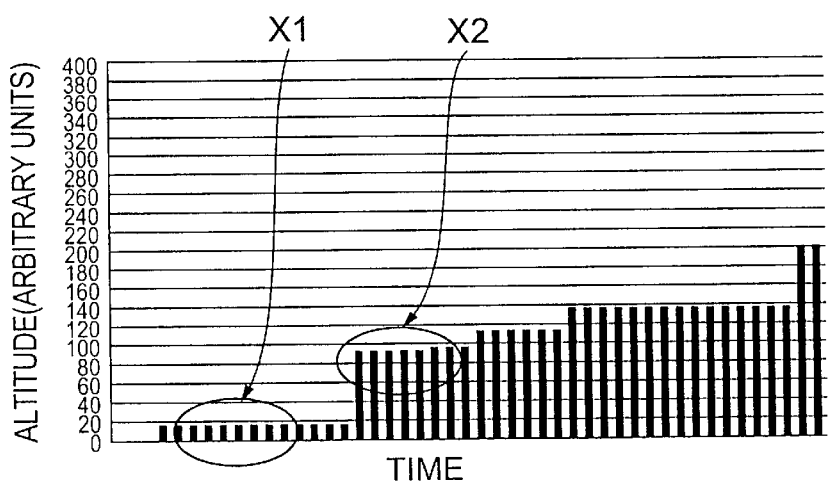

In the case of the time/estimated altitude bar graph of ②, the bar graph of the seventh embodiment shown in FIG. 23B is generated based on time/altitude data where pressures due to atmospheric fluctuations are eliminated. The estimated altitude which is the history of the users climb can therefore be accurately and intuitively understood compared with the bar graph in the comparative example shown in FIG. 24B. For example, the height that the user has climbed or ascended can be intuitively understood. The graph shows the case for ascent, but can be extended to the lower side to show the time of descent.

Figure 23C:
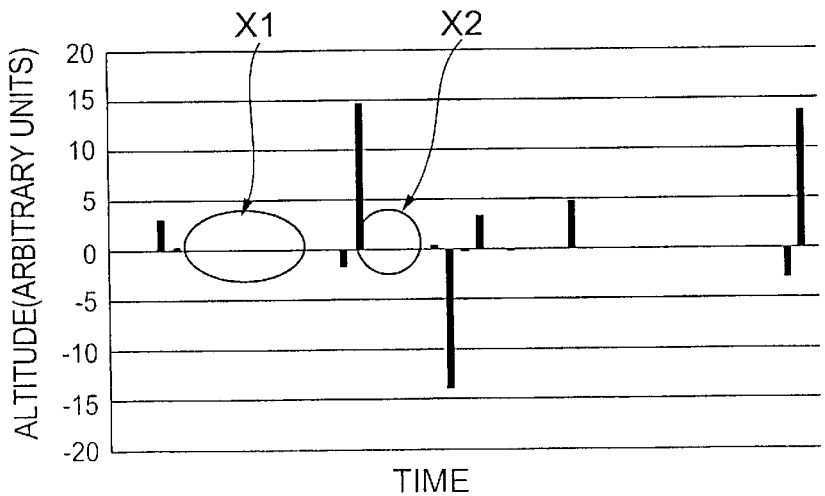

In the case of the ascent/descent rate bar graph of ③, the bar graph of the seventh embodiment shown in FIG. 23C is generated based on time/altitude data where pressures due to atmospheric fluctuations are eliminated. Changes in the ascent/descent rate can therefore be accurately and intuitively understood compared with the bar graph in the comparative example shown in FIG. 24C. For example, a user can intuitively know when an ascent just made was much tougher than an ascent made an hour beforehand.

Figure 25A:
FIG. 25 are view showing an example display screen.
Figure 25B:
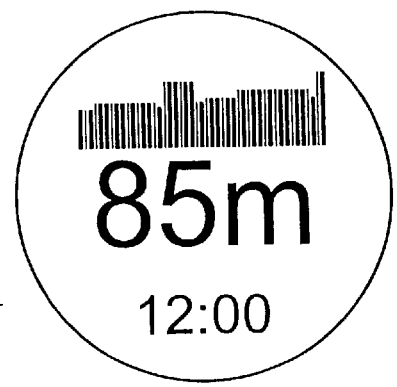

Next, a description is given of methods of displaying each bar graph generated as described above, and is given for the case where the portable altimeter is formed integrally with a wristwatch. FIG. 25 are view showing an example of a displayed screen, where FIG. 25A is a screen for time display mode and FIG. 25B is a screen for altitude display mode. The time (without seconds) and day, etc. are displayed in time display mode and a time/altitude bar graph, the altitude at the current point, and the time are shown in altitude display mode.

It is preferable for altitude display mode to be automatically switched to from time display mode when the controller 40 detects movement, and for the time display mode to be automatically switched to from altitude display mode when a standstill state is detected. A region for the program executed in this case can be maintained in the appropriate manner at the controller 40. A description is given for the case of the altitude display mode but the same also applies for switching between an estimated altitude mode displaying a bar graph of estimated altitude and an ascent/descent mode for displaying a bar graph of ascent/descent rate. In this case it can be preset beforehand for the user to be able to switch between any of the modes. Switching between modes is generally carried out using a key input.

Figure 26:
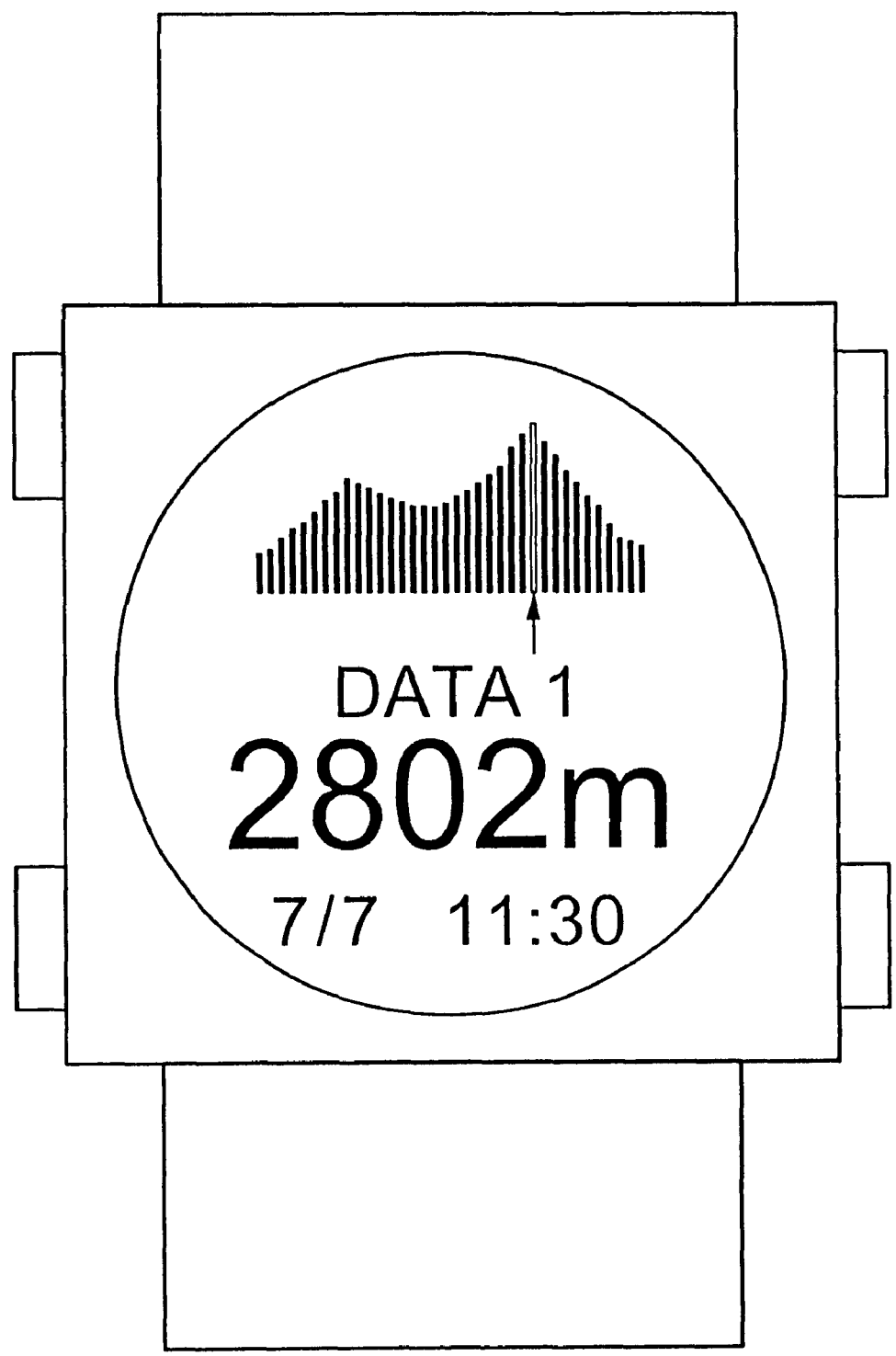
FIG. 26 is a further view showing an example display screen.

FIG. 26 is a view showing an example display screen. This display is especially executed after a user has reached a summit. Here, the acquired bar graph display data is stored in the RAM 9 and is displayed, for example, when the user wishes to reminisce about that day. At this time, the controller 40 calls the various bar graph display data from the RAM 9 as appropriate, for display.

It is preferable for the display data and altitude data to be displayed in a linked manner. For example, as shown in FIG. 26, when a time/altitude bar graph is displayed in altitude display mode, it is preferable for a user to be able to select one bar of the bar graph, and for the altitude and time for the selected bar to then be displayed. This selection is, for example, displayed by a pointer pointing to the bar graph on the display screen, with a key for moving this pointer then being provided at the portable altimeter.

If the controller 40 then transfers the various data recorded in the RAM 9 to a personal computer etc. via the external interface 50 for displaying, mountain shapes, etc. taken from the various bar graphs acquired as described above can be printed out or processed corresponding to the users requirements.

A description is given in the seventh embodiment of the case of generating bar graphs based on altitudes calculated using the configuration and processing of the first embodiment but the bar graphs can also be generated based on altitudes calculated using the configurations and processes of the second to sixth embodiments. The first to sixth embodiments can also be provided with the external interface 50 in order to output various data to a personal computer, etc.

As described above, in addition to substantially the same basic structure as the related art, the portable altimeter of the present invention is provided with a movement determining unit for determining whether or not the altimeter is at a standstill or is moving by comparing an amount of change in altitude with a prescribed standstill threshold value and a movement threshold value. The current altitude is then decided based on determination results of the determination unit. Therefore, determinations are made taking into consideration the situation up until that point in indeterminate cases where it is not clear whether the altimeter is at a standstill or moving and a much more accurate determination can therefore be achieved. The presence or absence of an actual change in altitude can therefore be precisely determined and highly accurate altitude measurements can be made.

Further, the presence or absence of movement of the altimeter can be determined using this process without it being necessary to provide sensors such as vibration sensors or position sensors. The device is therefore prevented from becoming large and a small altimeter with a configuration suited to portable applications can be provided.

In the present invention, when moving mode is temporarily set and the amount of change in atmospheric pressure or altitude continues within an intermediate range a prescribed number of times or more, it is determined that the altimeter has made a transition to being at a standstill, and the mode is updated to standstill mode. Even with this process, the altimeter can be determined to be at a standstill and the displayed altitude can be updated when the amount of change is continuously positioned within an intermediate range but does not reach the standstill threshold value. In addition to the basic results stated above, and altitude precision is improved.

According to a further aspect of the present invention, determinations are made taking into consideration the magnitude of the amount of change with respect to the moving threshold value and the continued time within the intermediate range. In this case in particular it is not necessary to set the standstill threshold value or determine the magnitude of the amount of change with respect to the standstill threshold value, and the amount of processing required is therefore reduced.

In addition to the above process, according to a further aspect of the present invention it is also possible to carry out correction taking into consideration the tendency of changes in atmospheric pressure occurring in standstill mode, i.e. a tendency value indicating the tendency of the amount of change of the atmospheric pressure is obtained based on the amount of change of atmospheric pressure obtained when the altimeter is in standstill mode and a current altitude is decided based on this tendency value. In this case, the tendency of the change in atmospheric pressure in standstill mode is taken into consideration and correction of the displayed altitude is then carried out to give much more precise altitude measurements.

What is claimed is:

1. A portable altimeter comprising:
   a pressure sensor for measuring external atmospheric pressure;
   a pressure/altitude calculating unit for calculating an altitude of the portable altimeter based upon a pressure measured by the pressure sensor;
   an altitude variation calculating unit for calculating a difference in altitude between a current altitude calculated by the pressure/altitude calculating unit and a previously calculated altitude; and
   a movement determining unit comprising a first determining unit for determining whether or not the portable altimeter is in a standstill state in which it is not changing in altitude based upon an altitude difference calculated by the altitude variation calculating unit, and a second determining unit for determining whether or not the portable altimeter is in a moving state in which it is changing in altitude based upon the altitude difference calculated by the altitude variation calculating unit.

2. A portable altimeter according to claim 1; wherein the movement determining unit has a movement duration timer for measuring a duration or a number of fixed durations occurring while the portable altimeter is in the moving state.

3. A portable altimeter according to claim 1; further comprising a pressure gradient calculator for calculating changes in pressure occurring while the portable altimeter is in the standstill state.

4. A portable altimeter according to claim 2; further comprising a pressure gradient calculator for calculating changes in pressure occurring while the portable altimeter is in the standstill state.

5. A portable altimeter comprising:
   a pressure sensor for measuring external atmospheric pressure;
   a pressure/altitude calculating unit for calculating an altitude of the portable altimeter based upon a pressure measured by the pressure sensor;
   an altitude variation calculating unit for calculating a difference in altitude between a current altitude calculated by the pressure/altitude calculating unit and a previously calculated altitude; and
   a movement determining unit comprising a determining unit for determining whether or not the portable altimeter is in a moving state in which it is changing in altitude based upon the altitude difference calculated by the altitude variation calculating unit, and a movement duration timer for measuring a duration or a number of fixed durations occurring while the portable altimeter is in the moving state.

6. A portable altimeter comprising:
   a pressure sensor for measuring external atmospheric pressure;
   a pressure/altitude calculating unit for calculating an altitude of the portable altimeter based upon pressure measured by the pressure sensor;
   an altitude variation calculating unit for calculating a difference in altitude between a current altitude calculated by the pressure/altitude calculating unit and a previously calculated altitude; and
   a movement determining unit comprising a determining unit for determining whether or not the portable altimeter is in a moving state in which it is changing in altitude based upon the altitude difference calculated by the altitude variation calculating unit, and a movement duration timer for measuring a duration or a number of fixed durations occurring while the portable altimeter is in the moving state; and
   a pressure gradient calculator for calculating changes in pressure occurring while the portable altimeter is in a standstill state in which it is not changing in altitude.

7. A portable altimeter according to claim 1; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a time/altitude graph based on a relationship of the calculated altitude and time.

8. A portable altimeter according to claim 5; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a time/altitude graph based on a relationship of the calculated altitude and time.

9. A portable altimeter according to claim 6; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a time/altitude graph based on a relationship of the calculated altitude and time.

10. A portable altimeter according to claim 1; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a time/estimated-altitude graph based on a relationship of the calculated altitude and time.

11. A portable altimeter according to claim 5; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a time/estimated-altitude graph based on a relationship of the calculated altitude and time.

12. A portable altimeter according to claim 6; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a time/estimated-altitude graph based on a relationship of the calculated altitude and time.

13. A portable altimeter according to claim 1; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a rate of ascent/descent graph based on a relationship between a rate of ascent/descent calculated based upon a value for the obtained results, and time.

14. A portable altimeter according to claim 5; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a rate of ascent/descent graph based on a relationship between a rate of ascent/descent calculated based upon a value for the obtained results, and time.

15. A portable altimeter according to claim 6; further comprising a controller for calculating an altitude of the portable altimeter based on pressure changes accompanying actual changes in altitude of the portable altimeter and excluding changes in pressure accompanying fluctuations in atmospheric pressure unaccompanied with changes in altitude of the portable altimeter, and producing a rate of ascent/descent graph based on a relationship between a rate of ascent/descent calculated based upon a value for the obtained results, and time.

16. An altitude measuring method for a portable altimeter which measures altitude based on atmospheric pressure sampled at prescribed intervals, comprising:
  a threshold setting step for setting a standstill threshold value indicating a change in pressure corresponding to a standstill state in which the portable altimeter is not changing in altitude and setting a movement threshold value indicating a change in pressure corresponding to a moving state in which the portable altimeter is changing in altitude; and
  a movement determination step for determining that the portable altimeter is at a standstill state when an absolute value of a current change in pressure corresponds to an intermediate range between the standstill threshold value and the movement threshold value or falls below the standstill threshold value, determining that the portable altimeter has moved from a standstill state to a moving state when the absolute value of the current change in pressure exceeds the movement threshold value, and, determining that the portable altimeter remains in a moving state when the current change in pressure corresponds to an intermediate range between the standstill threshold value and the movement threshold value or exceeds the movement threshold value and the portable value was determined to be in a moving state in an immediately preceding measurement, and determines that the altimeter has moved from the moving state to the standstill state when the absolute value of the change in pressure falls below the standstill threshold value.

17. An altitude measuring method according to claim 16; wherein the movement determination step further comprises the step of determining that the altimeter has moved from the moving state to the standstill state when the absolute value of the a change in pressure continues to be in the intermediate range for a predetermined number of measurements.

18. An altitude measuring method for a portable altimeter which measures altitude based on pressure sampled at prescribed intervals, comprising:
  a movement threshold value setting step for setting a movement threshold value for an amount of change in pressure or altitude per prescribed period of time indicating a moving state of the portable altimeter in which the portable altimeter is changing in altitude; and
  a movement determination step for determining that the altimeter remains at a standstill state in which it is not changing in altitude when the portable altimeter was previously in the standstill state and an absolute value for a current amount of change in pressure or altitude falls below the movement threshold value, determining that the altimeter has moved from the standstill state to the moving state when the amount of change exceeds the movement threshold value, determining that the altimeter remains in a moving state when the portable altimeter was previously in the moving state and the current amount of change exceeds the movement threshold value, and determining that the altimeter has moved from the moving state to the standstill state when the absolute value of the amount of change falls below the movement threshold value but continues to be above a predetermined value.

19. An altitude measuring method according to claim 16; further comprising a tendency calculating step for obtaining a tendency value indicating a tendency in the amount of change of pressure by subjecting the amount of change in pressure obtained when the altimeter is determined to be at a standstill state to prescribed statistical processing; and wherein a current altitude of the portable altimeter is decided based on determination results of the movement determination step and the tendency value obtained in the tendency calculating step.

20. An altitude measuring method according to claim 17; further comprising a tendency calculating step for obtaining a tendency value indicating a tendency in the amount of change of pressure by subjecting the amount of change in pressure obtained when the altimeter is determined to be at a standstill state to prescribed statistical processing; and wherein a current altitude of the portable altimeter is decided based on determination results of the movement determination step and the tendency value obtained in the tendency calculating step.

21. An altitude measuring method according to claim 18; further comprising a tendency calculating step for obtaining a tendency value indicating a tendency in the amount of change of pressure by subjecting the amount of change in pressure obtained when the altimeter is determined to be at a standstill state to prescribed statistical processing; and wherein a current altitude of the portable altimeter is decided based on determination results of the movement determination step and the tendency value obtained in the tendency calculating step.

22. An altitude measuring method according to claim 16; further comprising an altitude recording step for acquiring altitude values of the portable altimeter at prescribed times based on pressure changes accompanying actual altitude changes and excluding changes in pressure accompanying fluctuations in atmospheric pressure but unaccompanied by changes in altitude of the portable altimeter; and a graph making step of making a time/altitude graph based on a relationship of the recorded altitude and time.

23. An altitude measuring method according to claim 17; further comprising an altitude recording step for acquiring altitude values of the portable altimeter at prescribed times based on pressure changes accompanying actual altitude changes and excluding changes in pressure accompanying fluctuations in atmospheric pressure but unaccompanied by changes in altitude of the portable altimeter; and a graph making step of making a time/altitude graph based on a relationship of the recorded altitude and time.

24. An altitude measuring method according to claim 18; further comprising an altitude recording step for acquiring altitude values of the portable altimeter at prescribed times based on pressure changes accompanying actual altitude changes and excluding changes in pressure accompanying fluctuations in atmospheric pressure but unaccompanied by changes in altitude of the portable altimeter; and a graph making step of making a time/altitude graph based on a relationship of the recorded altitude and time.

25. An altitude measuring method according to claim 16; further comprising an altitude recording step of acquiring altitude values of the portable altimeter at prescribed times based on pressure changes accompanying actual altitude changes and excluding changes in pressure accompanying fluctuations in atmospheric pressure but unaccompanied by changes in altitude of the portable altimeter; an estimation step of estimating and recording a recorded altitude; and a graph making step of making a time/estimated value graph based on a relationship of estimated values and time.

26. An altitude measuring method according to claim 17; further comprising an altitude recording step of acquiring altitude values of the portable altimeter at prescribed times based on pressure changes accompanying actual altitude changes and excluding changes in pressure accompanying fluctuations in atmospheric pressure but unaccompanied by changes in altitude of the portable altimeter; an estimation step of estimating and recording a recorded altitude; and a graph making step of making a time/estimated value graph based on a relationship of estimated values and time.

27. An altitude measuring method according to claim 18; further comprising an altitude recording step of acquiring altitude values of the portable altimeter at prescribed times based on pressure changes accompanying actual altitude changes and excluding changes in pressure accompanying fluctuations in atmospheric pressure but unaccompanied by changes in altitude of the portable altimeter; an estimation step of estimating and recording a recorded altitude; and a graph making step of making a time/estimated value graph based on a relationship of estimated values and time.

28. An altitude measuring method according to claim 16; further comprising an altitude recording step of acquiring altitudes of the portable altimeter at prescribed times based on pressure changes accompanying actual altitude changes and excluding changes in pressure accompanying fluctuations in atmospheric pressure but unaccompanied by changes in altitude of the portable altimeter; an ascent/descent rate calculating step of calculating and recording a rate of ascent/descent of the portable altimeter from the recorded altitude; and a graph making step of making an ascent/descent rate graph based on a relationship of ascent/descent rate values obtained through calculation, and time.

29. An altitude measuring method according to claim 17; further comprising an altitude recording step of acquiring altitudes of the portable altimeter at prescribed times based on pressure changes accompanying actual altitude changes and excluding changes in pressure accompanying fluctuations in atmospheric pressure but unaccompanied by changes in altitude of the portable altimeter; an ascent/descent rate calculating step of calculating and recording a rate of ascent/descent of the portable altimeter from the recorded altitude; and a graph making step of making an ascent/descent rate graph based on a relationship of ascent/descent rate values obtained through calculation, and time.

30. An altitude measuring method according to claim 18; further comprising an altitude recording step of acquiring altitudes of the portable altimeter at prescribed times based on pressure changes accompanying actual altitude changes and excluding changes in pressure accompanying fluctuations in atmospheric pressure but unaccompanied by changes in altitude of the portable altimeter; an ascent/descent rate calculating step of calculating and recording a rate of ascent/descent of the portable altimeter from the recorded altitude; and a graph making step of making an ascent/descent rate graph based on a relationship of ascent/descent rate values obtained through calculation and time.

31. A portable altimeter comprising: a pressure sensor for measuring external atmospheric pressure; an altitude calculating unit for calculating an altitude of the portable altimeter based upon a pressure measured by the pressure sensor; an altitude variation calculating unit for calculating a difference in altitude between a current altitude calculated by the altitude calculating unit and a previously calculated altitude; a movement determining unit for determining whether or not the portable altimeter is in a moving state in which it is changing in altitude based upon the altitude difference calculated by the altitude variation calculating unit; and a controller for controlling the altitude calculating unit to calculate an altitude of the portable altimeter only when the movement determining unit determines that the portable altimeter is in a moving state.

32. A portable altimeter according to claim 31; wherein the controller controls the altitude calculating unit to calculate an altitude of the portable altimeter based on pressure changes accompanying actual changes in altitude of the portable altimeter and excluding changes in pressure accompanying fluctuations in atmospheric pressure but unaccompanied with changes in altitude of the portable altimeter.

33. A portable altimeter according to claim 31; wherein the movement determining unit determines that the portable altimeter is in a moving state when the altitude difference exceeds a prestored movement threshold value and determines that the portable altimeter is in a standstill state in which an altitude thereof is not changing when the altitude difference is below a prestored standstill threshold value.

34. A portable altimeter according to claim 33; wherein the movement threshold value is larger than the standstill threshold value so that an intermediate range lies therebetween.

35. A portable altimeter according to claim 34; wherein the movement determining unit determines that the portable altimeter is in a moving state when a predetermined number of successively measured altitude difference values are in the intermediate range.

36. A portable altimeter according to claim 31; wherein the movement determining unit comprises a first determining unit for determining whether or not the portable altimeter is in a standstill state in which it is not changing in altitude based upon an altitude difference calculated by the altitude variation calculating unit, and a second determining unit for determining whether or not the portable altimeter is in a moving state in which it is changing in altitude based upon the altitude difference calculated by the altitude variation calculating unit.

37. A portable altimeter according to claim 31; further comprising a movement duration timer for measuring a duration or a number of fixed durations occurring while the portable altimeter is in the moving state.

38. A portable altimeter according to claim 31; further comprising a pressure gradient calculator for calculating changes in pressure occurring while the portable altimeter is in the standstill state.

* * * * *